(12) United States Patent
Nodder

(10) Patent No.: US 11,778,144 B2
(45) Date of Patent: Oct. 3, 2023

(54) VEHICLE MONITORING

(71) Applicant: Alarm.com Incorporated, Tysons, VA (US)

(72) Inventor: Stephen Nodder, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/318,077

(22) Filed: May 12, 2021

(65) Prior Publication Data

US 2021/0274130 A1 Sep. 2, 2021

Related U.S. Application Data

(63) Continuation of application No. 16/281,647, filed on Feb. 21, 2019, now Pat. No. 11,012,667.
(Continued)

(51) Int. Cl.
| | |
|---|---|
| *H04N 7/18* | (2006.01) |
| *G08B 13/196* | (2006.01) |
| *B60R 25/30* | (2013.01) |
| *B60R 25/10* | (2013.01) |
| *B60R 25/32* | (2013.01) |
| *B60R 25/102* | (2013.01) |
| *G06V 20/52* | (2022.01) |
| *H04N 23/54* | (2023.01) |

(52) U.S. Cl.
CPC ........... *H04N 7/181* (2013.01); *B60R 25/102* (2013.01); *B60R 25/1003* (2013.01); *B60R 25/305* (2013.01); *B60R 25/32* (2013.01); *G06V 20/52* (2022.01); *G08B 13/19647* (2013.01); *G08B 13/19695* (2013.01); *H04N 23/54* (2023.01); *B60R 2025/1016* (2013.01)

(58) Field of Classification Search
CPC .... H04N 7/181; B60R 25/102; B60R 25/305; B60R 25/32; G08B 13/19695; G08B 13/19647; G06Q 20/405; G06Q 20/145; G07C 5/008
See application file for complete search history.

(56) References Cited

U.S. PATENT DOCUMENTS

| | | |
|---|---|---|
| 6,618,657 B1 | 9/2003 | Geil et al. |
| 7,081,836 B2 | 7/2006 | Biermann |

(Continued)

*Primary Examiner* — Rowina J Cattungal
(74) *Attorney, Agent, or Firm* — Fish & Richardson P.C.

(57) ABSTRACT

A monitoring system is configured to monitor a property. The monitoring system includes a property sensor that is configured to generate property sensor data that reflects an attribute of the property. The monitoring system includes a vehicle sensor that is configured to generate vehicle sensor data that reflects an attribute of a vehicle associated with the property. The monitoring system includes a monitor control unit that is configured to analyze the property sensor data and the vehicle sensor data. The monitor control unit is further configured to, based on analyzing the property sensor data and the vehicle sensor data, determine that an event associated with the vehicle has likely occurred. The monitor control unit is further configured to, based on determining that the event associated with the vehicle has likely occurred, determine a monitoring system action. The monitor control unit is further configured to perform the monitoring system action.

18 Claims, 8 Drawing Sheets

Related U.S. Application Data

(60) Provisional application No. 62/633,239, filed on Feb. 21, 2018.

(56) References Cited

U.S. PATENT DOCUMENTS

| | | | |
|---|---|---|---|
| 9,189,897 B1* | 11/2015 | Stenneth | G07C 5/008 |
| 9,240,080 B2* | 1/2016 | Lambert | G08G 1/20 |
| 9,934,625 B1* | 4/2018 | Wahba | G07C 5/008 |
| 10,460,534 B1* | 10/2019 | Brandmaier | G08G 1/0112 |
| 10,937,103 B1* | 3/2021 | Marlow | G06Q 40/08 |
| 10,977,881 B1* | 4/2021 | Buentello | G06Q 20/405 |
| 10,984,479 B1* | 4/2021 | Kyne | H04L 67/12 |
| 11,017,476 B1* | 5/2021 | Gainer | G07C 5/0808 |
| 2002/0177926 A1 | 11/2002 | Lockwood et al. | |
| 2006/0061483 A1 | 3/2006 | Smith et al. | |
| 2006/0202815 A1 | 9/2006 | John | |
| 2007/0067079 A1 | 3/2007 | Kosugi | |
| 2008/0077451 A1 | 3/2008 | Anthony et al. | |
| 2014/0049385 A1 | 2/2014 | Mueller | |
| 2015/0364028 A1 | 12/2015 | Child et al. | |
| 2016/0344509 A1 | 11/2016 | Hayman | |
| 2016/0364979 A1 | 12/2016 | Warren | |
| 2017/0136943 A1 | 5/2017 | Gurunathan | |
| 2017/0158238 A1 | 6/2017 | Takaso et al. | |
| 2017/0337805 A1 | 11/2017 | Eyring et al. | |
| 2017/0374324 A1 | 12/2017 | Loftus | |
| 2018/0218582 A1 | 8/2018 | Hodge et al. | |
| 2018/0233015 A1 | 8/2018 | Feng | |
| 2018/0364706 A1 | 12/2018 | Schwindt | |

* cited by examiner

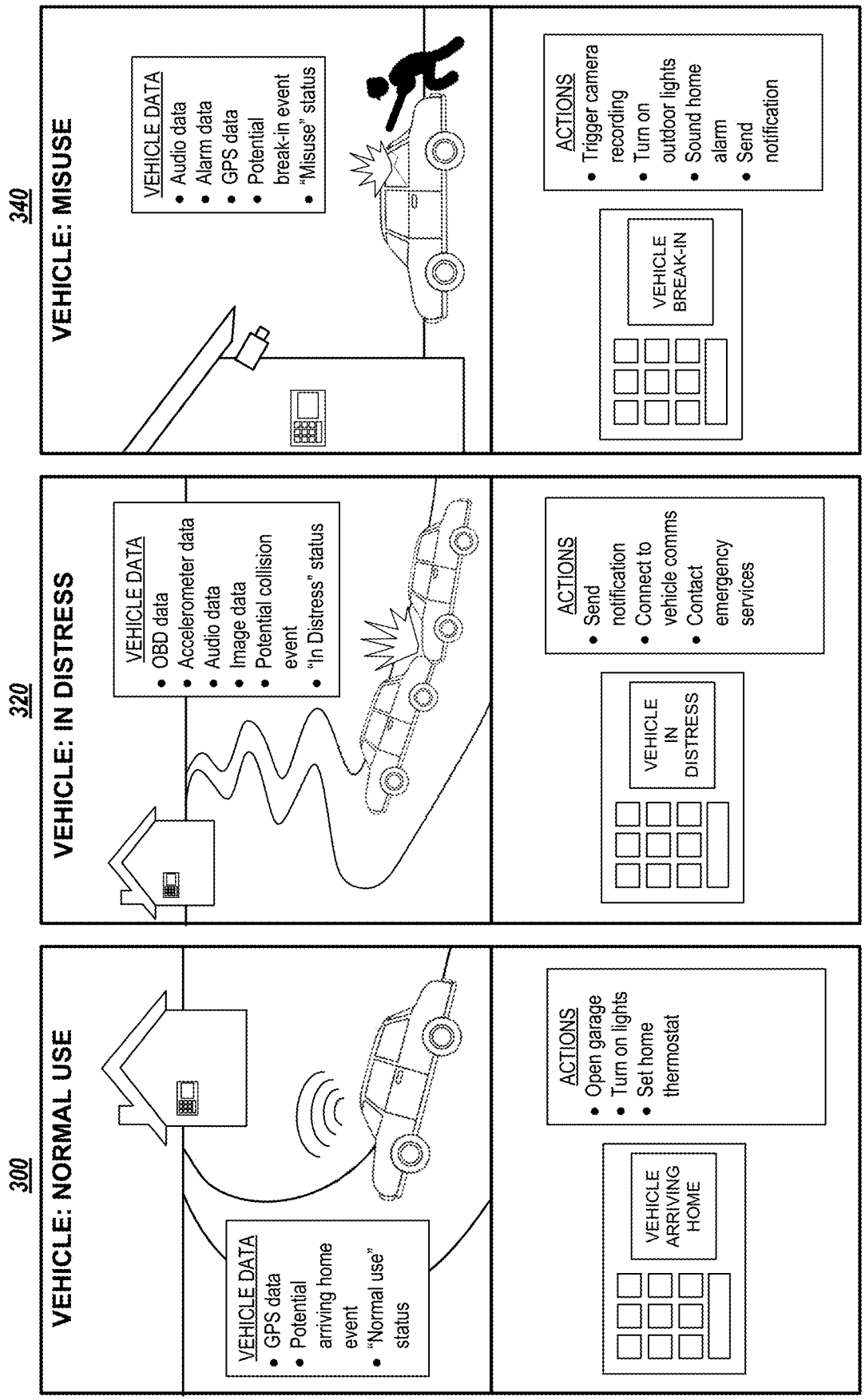

VEHICLE MONITORING

CROSS-REFERENCE TO RELATED APPLICATIONS

This application is a continuation of U.S. application Ser. No. 16/281,647, filed Feb. 21, 2019, now allowed, which claims the benefit of U.S. Application No. 62/633,239, filed Feb. 21, 2018. The complete disclosures of all of the above patent applications are hereby incorporated by reference in their entirety for all purposes.

TECHNICAL FIELD

This document generally related to monitoring systems.

BACKGROUND

A vehicle owner may desire to monitor a personal vehicle to enhance security and safety.

SUMMARY

A vehicle owner may want to monitor a personal vehicle to enhance the security of the vehicle and their safety when operating it. For example, a vehicle owner may want to monitor their vehicle for conditions of distress (e.g., a collision or accident, driver incapacity, vehicle malfunction) or misuse (e.g., reckless driving, driving outside of a predefined geographic region, vandalism, theft).

Many vehicle owners also own a property, such as a house or a place of business, that they equip with a monitoring system to enhance the security of the property. The property monitoring system may include one or more sensors, such as cameras or motion detectors, distributed about the property to monitor conditions at the property. In many cases, the property monitoring system also includes one or more controls, which enable automation of various property actions, such as locking/unlocking a door, setting a thermostat, or opening/closing a garage door. By integrating the sensors or controls of a vehicle with a property monitoring system, the safety and security provided by the property monitoring system can be extended outside of the home, to the owner's personal vehicle.

The disclosed systems and techniques provide one or more of the following advantages. Real-time monitoring of a vehicle by a property monitoring system enables detection of distress when a driver or passenger is injured, incapacitated, or unable to communicate as the result of an automobile accident or medical emergency. Upon detection of distress, the property monitoring system is able to quickly and automatically alert emergency personnel (e.g., ambulance, police, fire department), promoting the rapid delivery of critical emergency services. Integrating vehicle monitoring with an existing property monitoring system enables users to access and configure monitoring functions for mobile and immobile property through a single software application, providing a convenient interface for owners and reducing the number of new software applications they must learn and track. Furthermore, monitoring a vehicle's status creates a safer environment for the driver by providing reminders when the vehicle reaches a low fuel level or requires regular maintenance.

Additionally, the owner's comfort and convenience may be enhanced by automating home actions performed by the property monitoring system in response to vehicle data. For example, the property monitoring system may open a garage door, turn on outdoor lights, and change a thermostat setting in response to detecting that the owner's vehicle is arriving at the premises. The system may enhance the owner's safety by warning of insecure or dangerous conditions on a property (e.g., detection of an unauthorized person on the premises) when the owner arrives home in the vehicle, reducing the risk of assault or kidnapping.

According to an innovative aspect of the subject matter described in this application, a monitoring system is configured to monitor a property. The monitoring system includes a property sensor that is configured to generate property sensor data that reflects an attribute of the property; a vehicle sensor that is configured to generate vehicle sensor data that reflects an attribute of a vehicle associated with the property; and a monitor control unit that is configured to: analyze the property sensor data and the vehicle sensor data; based on analyzing the property sensor data and the vehicle sensor data, determine that an event associated with the vehicle has likely occurred; based on determining that the event associated with the vehicle has likely occurred, determine a monitoring system action; and perform the monitoring system action.

These and other implementations can each optionally include one or more of the following features. The monitor control unit is configured to determine whether the arming status of the monitoring system is armed away, armed stay, or unarmed; and determine the monitoring system action further based on whether the arming status of the monitoring system is armed away, armed stay, or unarmed. The monitor control unit is configured to classify the event associated with the vehicle as a normal event, a distress event, or a misuse event; and determine the monitoring system action further based on classifying the event associated with the vehicle as a normal event, a distress event, or a misuse event. The monitor control unit is configured to determine that an event associated with the vehicle has likely occurred by determining that the vehicle is approaching the property; and classify the event associated with the vehicle as a normal event.

The monitoring system action includes opening a garage door of the property, disarming the monitoring system, and activating lights in the property. The property sensor is a camera and the property sensor data is property image data. The vehicle sensor is an accelerometer and the vehicle sensor data is vehicle accelerometer data. The monitor control unit is configured to determine that an event associated with the vehicle has likely occurred by determining that the vehicle has likely been in an accident and that the vehicle is not located in a field of view of the camera. The monitoring system action comprises activating an additional camera that is located on the vehicle. The monitoring system further includes a camera that is configured to generate image data of the property. The property sensor is a motion sensor that is configured to generate property motion sensor data. The vehicle sensor is door sensor that is configured to generate door sensor data that indicates a status of the doors of the vehicle. The monitor control unit is configured to determine that an event associated with the vehicle has likely occurred by determining that the vehicle has been broken-in to.

The monitoring system action comprises activating the camera. The monitoring system action includes arming the monitoring system. The property sensor is a motion sensor that is configured to generate property motion sensor data. The vehicle sensor is door sensor that is configured to generate door sensor data that indicates a status of the doors of the vehicle. The monitor control unit is configured to determine that an event associated with the vehicle has likely occurred by determining that the vehicle has been broken-in to. The monitoring system action includes activating an outdoor light of the property. The vehicle sensor is camera that is configured to generate image data. The monitor control unit is configured to, based on analyzing the property sensor data and the vehicle sensor data, determine that the vehicle is swerving. The monitoring system action includes generating and transmitting a notification to a third party. The camera is a rear-view camera.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A, 3B, and 3C are diagrams illustrating example scenarios of vehicle monitoring.

Like reference numbers and designations in the various drawings indicate like elements.

DETAILED DESCRIPTION

Figure 1:
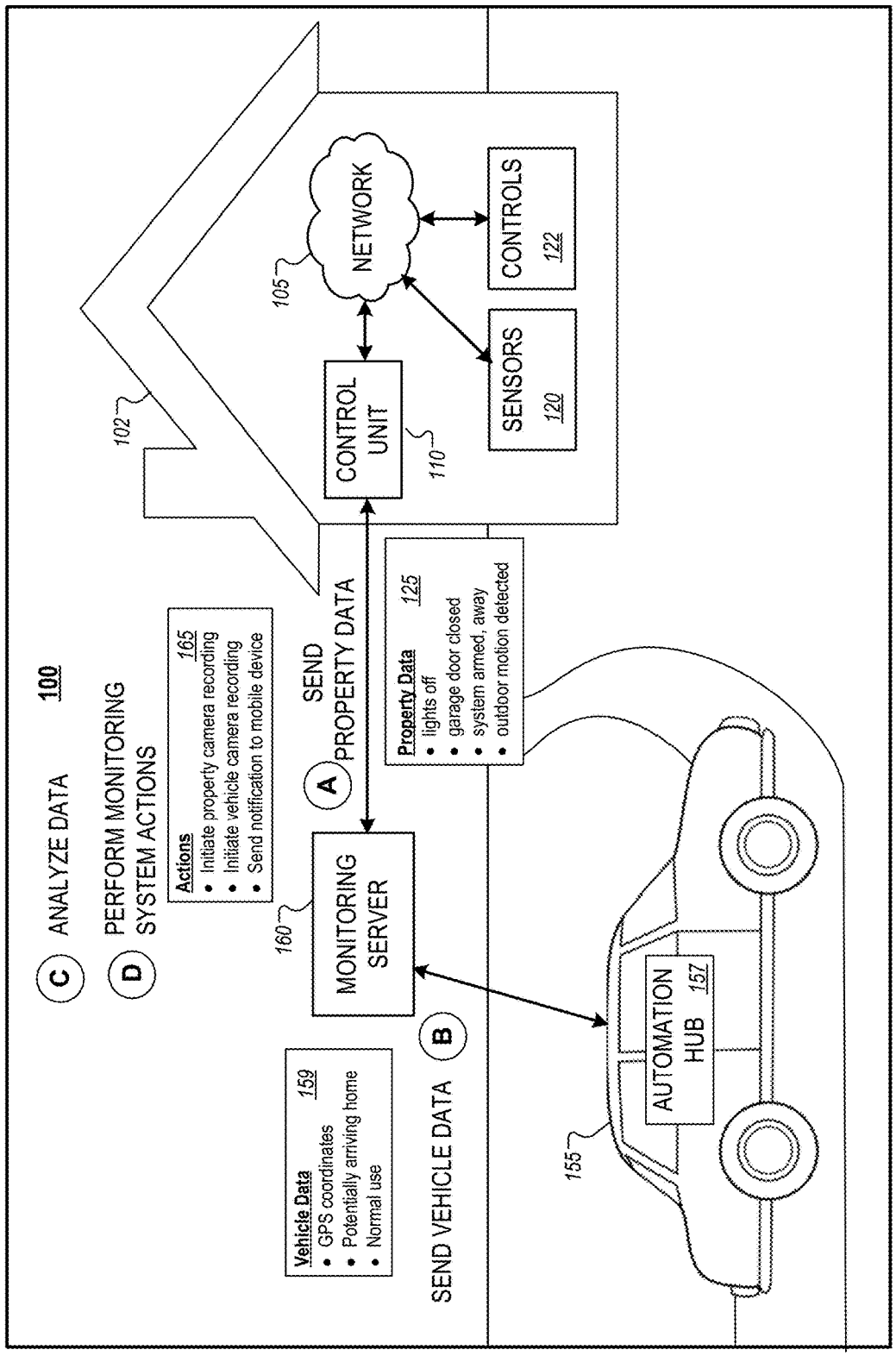
FIG. 1 is a diagram illustrating an example system for vehicle monitoring.

FIG. 1 is a diagram illustrating an example system 100 for vehicle monitoring. The system 100 includes a property 102 monitored by a property monitoring system. The property monitoring system includes a control unit 110 at the property 102 that sends property data 125 to a remote monitoring server 160. The system also includes a vehicle 155 that is equipped with a vehicle automation hub 157, which sends vehicle data 159 to the remote monitoring server 160. By receiving and analyzing both property data 125 and vehicle data 159, the monitoring server 160 may monitor the vehicle 155 and perform various functions that enhance the security and safety of the vehicle 155 or vehicle owner. FIG. 1 includes stages A through D, which represent a flow of data.

The system 100 includes a property 102 that is monitored by a property monitoring system. The property 102 may be, for example, a residence, such as a single family home, a town house, a condominium, or an apartment. In some examples, the property 102 may be a commercial property, a place of business, or a public property.

The property monitoring system includes one or more sensors 120 located in or on the property 102. The sensors 120 may include, for example, cameras that capture video or still images of an area of the property 102 or motion detectors that sense movement in a region of the property 102. The sensors 120 may also include appliance sensors, utility or resource usage sensors, microphones, temperature, humidity, or other sensors. In some implementations, one or more of the sensors 120 may be part of a robotic device or drone that is located at the property 102.

In some implementations, the sensors 120 may be related to one or more controls 122 of the property 102. For example, a sensor 120 may be integrated with a thermostat of a heating, ventilation, and air-conditioning (HVAC) system of the property 102. In some examples, the sensor 120 may report the current HVAC temperature setting or the current temperature measured by the HVAC system.

In some examples, the sensors 120 may be related to access points to the property 102. For example, a sensor 120 may detect whether a door or window is open or unlocked. A sensor 120 may report which resident's code or FOB device was used to unlock a door. In some examples, the sensors 120 may report the security status of the property monitoring system (e.g., armed, disarmed, etc.).

The system 100 also includes a control unit 110 that is located at the property 102. The control unit 110 may be, for example, a computer system or other electronic device configured to communicate with the sensors 120 and perform various functions for the property monitoring system. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded or dedicated hardware. The control unit 110 may include software, which configures the unit to perform the functions described in this disclosure. In some implementations, the property owner or a resident of the property 102 communicates with the control unit 110 through a physical connection (e.g., touch screen, keypad, etc.) and/or network connection. In some implementations, the property owner or resident communicates with the control unit 110 through a software ("smart home") application installed on their mobile device.

The sensors 120 communicate with the control unit 110, possibly through a network 105. The network 105 may be any communication infrastructure that supports the electronic exchange of data between the control unit 110 and the one or more sensors 120. The network 105 may include a local area network (LAN), a wide area network (WAN), the Internet, or other network topology. The network 105 may be any one or combination of wireless or wired networks and may include any one or more of Ethernet, cellular telephony, Bluetooth, Wi-Fi, Z-wave, Zigbee, Bluetooth, and Bluetooth LE technologies. In some implementations, the network 105 may include optical data links. To support communications through the network 105, one or more devices of the monitoring system may include communications modules, such as a modem, transceiver, modulator, or other hardware or software configured to enable the device to communicate electronic data through the network 105.

The sensors 120 send various sensor data to the control unit 110. For example, the sensors 120 can send image or video data from one or more camera sensors, motion sensing data from one or more motion detectors, or data related to a setting of device connected to the monitoring system (e.g., a door open setting, a door lock setting, the status of the system, etc.).

The control unit 110 can also communicate with one or more home automation controls 122 of the property 102. The controls 122 can include, for example, one or more of a thermostat, humidifier, door locks, interior or exterior lights.

In some implementations, the control unit 110 performs various operations related to the property 102 by sending commands to one or more of the controls 122. For example, the control unit 110 can change a thermostat setting, lock or unlock a door, open or close a garage door, or power on or off a light of the property 102 by sending a command to the appropriate control 122.

In some implementations, the control unit 110 also communicates with an authorized user mobile device, possibly through the network 105. The user mobile device may be associated with the property owner or a resident of the property 102 and may be, for example, a portable personal computing device, such as a cellphone, a smartphone, a tablet, a mobile device, or other electronic device. In some examples, the user mobile device is an electronic home assistant or a smart speaker.

The system 100 also includes a monitoring server 160, which may be remote from the property 102. The monitoring server 160 can be, for example, one or more computer systems, server systems, or other computing devices. In some implementations, the monitoring server 160 is a cloud computing platform.

The control unit 110 communicates with the remote monitoring server 160 via a long-range data link. The long-range data link can include any combination of wired and wireless data networks. For example, the control unit 110 may exchange information with the monitoring server 160 through a wide-area-network (WAN), a cellular telephony network, a cable connection, a digital subscriber line (DSL), a satellite connection, or other electronic means for data transmission. The control unit 110 and the monitoring server 160 may exchange information using any one or more of various communication synchronous or asynchronous protocols, including the 802.11 family of protocols, GSM, 3G, 4G, 5G, LTE, CDMA-based data exchange or other techniques.

In stage (A), the control unit 110 located at the property 102 sends property data 125 to the remote monitoring server 160. The property data 125 can include data collected by the one or more sensors 120, data related to the controls 122, data generated by the control unit 110, or other monitoring system data. For example, the control unit 110 may send video or still images captured by cameras 120 in the property 102, motion sensing data, appliance data, data related to energy or other resource (e.g., water, natural gas) usage, system settings (e.g., a thermostat setting), audio data, or any other monitoring system data. In some cases, the property data 125 is processed by the control unit 110 before being sent to the monitoring server 160 (e.g., filtered or downsampled image data, annotated data, transformed data, etc.). In some examples, the control unit 110 sends data related to the security status of the property monitoring system (e.g., armed, disarmed, home, away etc.) or the status of one or more points of entry to the property 102 (e.g., front door is locked, side window is open, etc.).

In the example of FIG. 1, the control unit 110 sends property data 125 to the monitoring server 160 that indicates the interior lights are turned off, the garage door is closed, the monitoring system status is "armed, away," and that an outdoor motion detector has sensed motion. The property data 125 of FIG. 1 could be collected, for example, when there are no occupants in the home, and there is an unauthorized person (e.g., a burglar or would-be kidnapper) lurking outside of the home.

The system 100 also includes a vehicle 155. The vehicle 155 may, for example, be the personal vehicle of the property owner or a resident of the property 102. The vehicle 155 may be any motorized platform used to transport people, animals, or goods, including an automobile—such as a sedan, truck, or passenger car—a motorcycle, or bus. In some implementations, the vehicle 155 can be autonomous or semi-autonomous, that is, the vehicle 155 can maneuver on its own with no or with limited human driver intervention.

The vehicle 155 is equipped with a vehicle automation hub 157. The automation hub 157 can be one or more computing devices designed to collect, analyze, and transmit vehicle data 159. In some implementations, the automation hub 157 receives vehicle data 159 from a computer system of the vehicle 155. For example, the automation hub 157 may communicate with a computer system of the vehicle 155 through an on-board diagnostic (OBD) port or device. The automation hub 157 can receive various vehicle data 159 from the vehicle's computer system, including, but not limited to, data related to vehicle performance (e.g., acceleration, braking, speed, etc.) and condition (e.g., fuel level, oil level, required maintenance, engine condition, ignition position, etc.).

The automation hub 157 also can receive vehicle data 159 from one or more additional sensors mounted on or in the vehicle 155. For example, the vehicle 155 may be equipped with one or more accelerometers, cameras, or microphones, which may send collected data to the automation hub 157. In some implementations, the automation hub 157 receives data related to the location of the vehicle 155 (e.g., GPS data), from either the computer system of the vehicle 155 or from another vehicle sensor (e.g., a GPS receiver).

The automation hub 157 may process and/or analyze the received vehicle data 159. In some implementations, the automation hub 157 analyzes vehicle data 159 to detect a potential event related to the vehicle. For example, the automation hub 157 may analyze braking data indicating that a driver of the vehicle 155 applied hard braking, accelerometer data indicating that the vehicle 157 quickly decelerated, and data from the vehicle's computer system indicating that an airbag deployed. As a result, the automation hub 157 may detect that the vehicle has potentially experienced a collision or accident. As another example, the automation hub 157 may analyze vehicle data 159 indicating that the vehicle speed exceeds a predetermined threshold and that the vehicle 159 is rapidly swerving. As a result, the automation hub 157 may detect a potential reckless driving event.

The automation hub 157 can also analyze received vehicle data 159 to generate additional vehicle data 159, such as a status of the vehicle 155. In some implementations, the vehicle status may be one of normal use, in distress, or misuse. The automation hub 157 can use any received or generated vehicle data 159 to determine the vehicle status. For example, the automation hub 157 may determine the vehicle status to be normal use when the vehicle 155 is parked at home or driving at a safe speed.

In some implementations, the automation hub 157 may determine the vehicle status based, at least in part, on a detected potential vehicle event. For example, by analyzing GPS data, the automation hub 157 may determine that the vehicle 155 has entered a region within a predetermined distance of the property 102 (i.e., a geofence). The automation hub 157 may thus detect that the vehicle 155 is potentially arriving home. Based on detecting an arriving home event, the automation hub 157 may determine that the vehicle status is normal use. The vehicle status may also be normal use when the automation hub 157 when it detects any of various other events, including that the vehicle 155 requires non-emergency maintenance (e.g., an oil change), or that the vehicle's fuel tank is low but not empty.

In some implementations, the automation hub 157 analyzes vehicle data 159 to determine an in distress status. For example, the automation hub 157 may associate detection of a potential accident, a serious mechanical malfunction of the vehicle, or an empty vehicle fuel tank with an in distress status.

In some implementations, the automation hub 157 analyzes vehicle data 159 to determine a misuse vehicle status. For example, the automation hub 157 may associate detection of potential reckless driving, a vehicle break-in, or vandalism with a misuse status. In some examples, the automation hub 157 may determine a misuse status if it detects the vehicle 155 to be driven outside of an authorized geographic area (e.g., as detected by crossing a geofence).

In stage (B), the automation hub 157 sends vehicle data 159 to the monitoring server 160. The vehicle automation hub 157 communicates electronically with the monitoring server 160 through a wireless network, such as a cellular telephony or data network, through any of various communication protocols (e.g., GSM, LTE, CDMA, 3G, 4G, 5G, 802.11 family, etc.).

In some examples, the automation hub 157 sends vehicle data 159, including fuel gauge data, vehicle performance data, vehicle condition data, vehicle location data, or other data received from a computer system or sensor of the vehicle 155. The automation hub 157 can send processed vehicle data 159, for example, processed image or video data recorded by a camera of the vehicle 155, filtered audio data recorded by a microphone in the cabin of the vehicle 155, or selected acceleration data recorded by an accelerometer on the vehicle 155.

The automation hub 157 can also send vehicle data 159 generated by the hub, for example, a detected potential event or vehicle status. For example, the automation hub 157 may send to the monitoring server 160 vehicle data 159 indicating that the vehicle 155 potentially experienced an accident and may be in distress.

In the example of FIG. 1, the automation hub 157 sends vehicle data 159 to the monitoring server 160 that includes the vehicle's GPS coordinates, a potential arriving home event (e.g., the GPS coordinates indicate the vehicle 155 entered an area defined by a geofence surrounding the property 102), as well as a status of normal use.

In stage (C), the monitoring server 160 analyzes the vehicle data 159 received from the automation hub 157 and the property data 125 received from the control unit 110. In some examples, the monitoring server 160 analyzes the vehicle data 159 and/or the property data 125 to verify, modify, or determine a detected potential vehicle event (e.g., accident, driving recklessly, break-in, arriving home, leaving authorized driving area, etc.) or vehicle status (e.g., normal use, distress, misuse).

In some implementations, the automation hub 157, with a size and power draw limited by the vehicle installation, has more limited processing capabilities than the remote monitoring server 160. As a result, the monitoring server 160 can perform more sophisticated analyses and more intensive processing of the vehicle data 159 and property data 125 to determine vehicle events, a vehicle status, and other information related to the safety and security of the vehicle 155 or property 102. In some examples, by analyzing both vehicle data 159 and property data 125, the monitoring server 160 may be able to detect an event or determine a vehicle status with greater accuracy and/or specificity than the automation hub 157 determines using vehicle data 159 alone. For example, the automation hub 157 may detect a potential arriving home event based on vehicle data 159 (e.g., GPS data) indicating that the vehicle 155 has crossed a predefined geofence. Based on analyzing both vehicle data 159 and image data from a camera on the property 102, the monitoring server 160 may determine that the vehicle 155 is not simply arriving home, but is nearing a garage of the property 102.

The monitoring server 160 may analyze any of various vehicle data 159 and/or property data 125. In some cases, the monitoring server 160 can also analyze data received from the internet, for example a weather report or forecast for a current or predicted location of the vehicle 155, a traffic report for a current or predicted location of the vehicle 155, or other data relating to the environment of the property 102 or the vehicle 155. For example, based on vehicle data 159, property data 125, and data from the internet, the monitoring server 160 may determine that the vehicle 155 is arriving home and nearing a garage while it is raining.

In the example of FIG. 1, the monitoring server 160 analyzes the vehicle data 159 (e.g., GPS coordinates, potential arriving home event, normal use status) and property data 125 (e.g., interior lights off, garage door closed, system status is "armed, away", and motion detected outside) to determine that the vehicle 155 is arriving at home when there are no other occupants at the home and there may be an unauthorized person on the premises.

Based on the data analysis, in stage (D), the monitoring server 160 determines and perform one or more vehicle or monitoring system actions. The monitoring server 160 may perform any of various monitoring system actions, including setting an alarm or monitoring system status; sending a command to one or more devices of the monitoring system; sending a notification, alert, or message to an authorized user mobile device; sending a command to one or more sensors or controls of the vehicle 155 through the automation hub 157; and contacting a third party, such as emergency services, including roadside assistance and police, fire, or medical personnel.

In some implementations, the monitoring server 160 sends a command to a monitoring system device to perform an operation. For example, the server 160 may command an audible alarm to sound, a door lock to secure, a light to turn on or off, a camera to begin recording. In some examples, the server 160 elevates or downgrades the security status of the monitoring system or sends an alarm to a central alarm server.

In some implementations, the monitoring server 160 sends a command to the automation hub 157 to cause vehicle device to perform an operation. For example, the monitoring server 160 can send a command to the automation hub 157 to initiate recording by a camera on the vehicle 155. In some cases, the monitoring server 160 can broadcast an audio message through a speaker of the vehicle 155 or connect a communication system of the vehicle 155 to emergency services personnel.

In some implementations, the monitoring server 160 sends one or more notifications, alerts, or messages to an authorized user mobile device. The user mobile device can be associated with the property owner, the vehicle owner, or another resident of the property 102. The monitoring server 160 can send a notification or alert to a user mobile device through a wireless network such as a cellular telephony or wireless data network by any of various communication protocols (e.g., GSM, LTE, CDMA, 3G, 4G, 5G, etc.). In some examples, the monitoring server 160 may send a message through a software application installed on the authorized user mobile device.

In some implementations, the action performed depends upon a detected potential event and/or the vehicle status. For example, the monitoring server 160 can receive from the automation hub 157 data indicating that the vehicle 155 is arriving home and the vehicle status is normal use. The monitoring server 160 may verify the detected event and the normal use status by determining from a camera on the property 102 that the vehicle 155 is approaching and no adverse events are detected. Based on property data, the monitoring server 160 may further determine that the lights in the home are off, the thermostat is set to low, and there has been no motion detected in the house for four hours, indicating that there are no occupants in the home. Based on determining that the vehicle is arriving home under normal use and there are no occupants in the home, the monitoring system 160 may prepare the home for the arrival of the vehicle's driver by sending one or more commands to monitoring system devices (e.g., to open a garage door, turn on lights, apply a setting to a thermostat, etc.).

As another example, the monitoring server 160 may receive vehicle data 159 indicating that the vehicle 155 has a very low fuel gauge, is located a significant distance away from the property 102, and is in distress. The monitoring server 160 may analyze the vehicle data 159 to determine that the vehicle 155 may be stranded and perform an action by sending a message to an authorized user mobile device asking if the server 160 should contact roadside assistance services. In some examples, in addition to the vehicle data 159 described above, the monitoring server 160 may also analyze map data from the internet to determine that the location of the vehicle 155 corresponds to a service station. Here, the monitoring server 160 may send a message to an authorized user device asking if the server 160 should change the vehicle status from in distress to normal use.

As another example, the monitoring server 160 may receive vehicle data 159 from the automation hub 157 detecting that the vehicle 155 was driven outside of an authorized driving area (e.g., the vehicle 155 exited an area defined by a geofence surrounding an authorized area) and the vehicle status is misuse. The server 160 may then send a message to an authorized mobile device alerting the user to the location of the vehicle 155 and asking if it corresponds to misuse. If the user responds that the use is authorized, the server 160 may change the vehicle status to normal use.

In the example of FIG. 1, based on the received vehicle data 159 and property data 125, the monitoring system determined that the vehicle 155 is arriving home, there are no occupants at the home, and there may be an unauthorized person on the premises. As a result, the monitoring system 160 performs the actions 165, which include initiating recording by a camera on the property 102, initiating recording by a camera on the vehicle 155, and sending notification to a user mobile device warning that there may be an unauthorized person outside of the home.

Though the stages are described above in order of (A) through (D), it is to be understood that other sequencings are possible and disclosed by the present description. For example, in some implementations, the monitoring server 160 may receive property data 125 from the control unit 110 and vehicle data 159 from the automation hub 157 concurrently. In some cases, one or more stages may be omitted. For example, in some implementations the monitoring server 160 may receive and/or analyze only property or vehicle data rather than both property and vehicle data.

Figure 2:
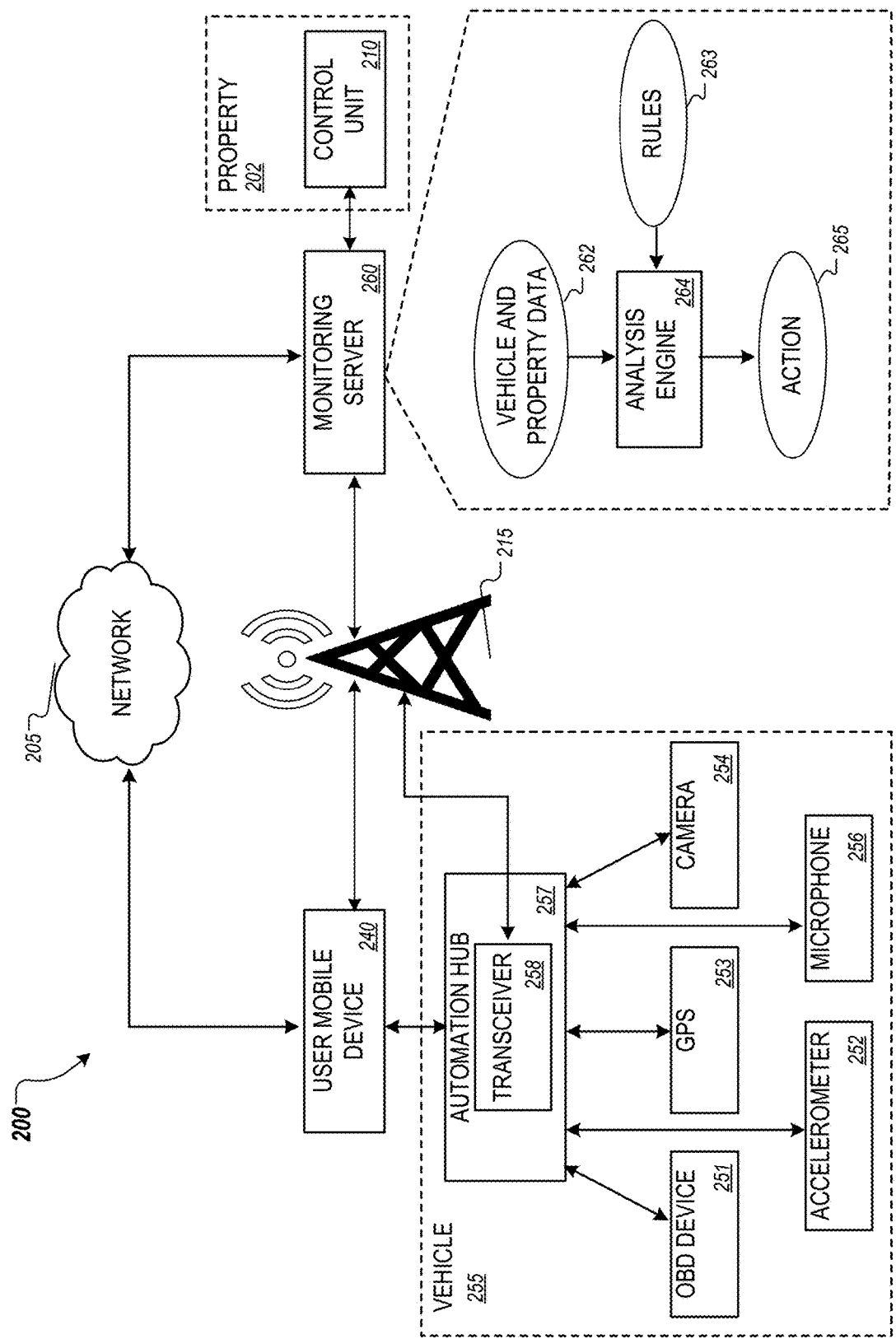
FIG. 2 is a diagram illustrating the components of an example system for vehicle monitoring.

FIG. 2 illustrates the components of an example system 200 for vehicle monitoring. The system 200 includes a vehicle 255, a monitoring server 260, a user mobile device 240, and a property 202. The vehicle 255 includes a vehicle automation hub 257, which sends vehicle data to the monitoring server 260, possibly through a wireless data network 215. In some implementations, the automation hub 257 sends vehicle data to a user mobile device 240, which then communicates with the monitoring server 260. The property 202 is monitored by a property monitoring system that includes a control unit 210, which sends property data to the monitoring server 260. Based on analyzing the vehicle data and/or the property data, the monitoring server 260 determines and performs one or more vehicle or monitoring system actions.

The vehicle automation hub 257 may include one or more computer systems. For example, the automation hub 257 may include any combination of microcontrollers, embedded systems, general purpose central processing units (CPUs), application-specific integrated circuits (ASICs), field-programmable gate arrays (FPGAs), or other computing devices.

The automation hub 257 may communicate with a computer system of the vehicle 255 through an on-board-diagnostic (OBD) device 251. The OBD device 251 may, for example, connect to the computer system of the vehicle 255 through a standard interface, such as an OBD-1, OBD1.5, or OBD-II interface, or connect through a custom interface.

Through the connection, the OBD device 251 may receive vehicle data from a computer system of the vehicle 255. For example, the OBD device 251 may receive data related to the condition of the vehicle 255, such as the maintenance status of one or more vehicle components, the fuel gauge level, or the engine status (e.g., off, idle, in gear). The OBD device 251 may receive data related to the driving performance of the vehicle 255, such as the speed, acceleration, braking performance, engine RPM, or other driving-related parameters. In some implementations, the OBD device 251 may receive data related to other functions or features of the vehicle 255, such as whether an airbag has deployed or a crash sensor has detected an impact.

In some examples, the OBD device 251 may report diagnostic trouble codes (DTCs) or other settings, codes, parameters, or commands related to the vehicle 255.

In some cases, the OBD device 251 receives vehicle data related to sensors integrated with a computer system of the vehicle 255. For example, the OBD device 251 may receive acceleration or motion data collected by an accelerometer or vehicle position data (e.g., GPS coordinates) collected by a GPS receiver that communicates with the vehicle's computer system.

The OBD device 251 may send some or all of the vehicle data obtained from the vehicle's computer system to the automation hub 257. In some implementations, the OBD device 251 may process the vehicle data before sending it to the automation hub 257.

In some examples, the automation hub is powered through the OBD device 251 or an OBD port of the vehicle 255. In other examples, the automation hub 257 may be powered through a cigarette lighter of the vehicle 255, or through direct connection to the vehicle battery.

The automation hub 257 can also communicate with one or more additional vehicle sensors of the vehicle 255, including, for example, one or more accelerometers 252, GPS receivers 253, cameras 254, or microphones 256. The automation hub 257 may communicate with the one or more vehicle sensors by exchanging electronic information over any combination of short-range wired and/or wireless connections and may use, for instance, Bluetooth or another low power wireless communication protocol such as Z-wave.

Any of the one or more sensors may be integrated as a component of the automation hub 257. The one or more sensors may also be distinct, standalone devices that communicate with the hub 257. For example, the camera 254 may be a dashboard camera, or a standalone camera mounted in the vehicle to capture images from the interior vehicle cabin. The automation hub 257 may receive vehicle data from the one or more vehicle sensors, and then store, process, or analyze the vehicle data.

In some examples, the automation hub 257 communicates with one or more controls of the vehicle 255. For example, the automation hub 257 can communicate with a vehicle alarm, a speaker, or other control. In some cases, the automation hub 257 communicates with one or more vehicle controls through a computer system of the vehicle 255.

In some implementations, the automation hub 257 analyzes the vehicle data from the OBD device 251 and/or the one or more sensors to detect a potential event or determine a vehicle status. For example, the automation hub 257 may receive data from the OBD device 251 indicating that the engine of the vehicle 255 is running, data from the accelerometer 252 indicating that the vehicle 255 has suddenly decelerated quickly, and data from the microphone 256 indicating a sharp change in sound (e.g., a loud noise) was detected. Based on analyzing the vehicle data, the automation hub 257 may detect that the vehicle may have experienced a collision and thus set the vehicle status as in distress.

As another example, the automation hub 257 may determine from vehicle data provided by the OBD device 251 and/or the vehicle sensors that it is after midnight, the engine of the vehicle 255 is off and there was a sharp change in sound (e.g., a loud noise) detected. Additionally, image data from one or more cameras 254 may show that there is an unknown individual near the vehicle 255. Based on analyzing the vehicle data, the automation hub 257 may detect a potential break-in and thus set the vehicle status as misuse.

In some implementations, the automation hub 257 includes a transceiver 258 for communicating with a monitoring server 260 through a wireless data network 215. The data network 215 may be, for example, a cellular telephony or data network that supports the long-range electronic exchange of data through any of various protocols (e.g., GSM, CDMA, GPRS, EDGE, WIMAX, LTE, HSPA or other 2G, 3G, 4G, or, 5G standard).

The monitoring server 260 is one or more computer systems that performs various operations for the system 200. For example, the monitoring server 260 may correspond to the server 160 of example system 100.

The automation hub 257 sends raw, processed, or generated vehicle data, which may include detected potential events and vehicle status, to the monitoring server 260 through the data network 215.

In some implementations, the automation hub 257 communicates with the monitoring server 260 through a user mobile device 240. In these implementations, the user mobile device 240 can be a cellphone, smart phone, or other portable computing device of a driver or passenger of the vehicle 255. When the user mobile device 240 is in proximity of the automation hub 257 (e.g., inside of or nearby to the vehicle 255), the hub 257 may communicate with the mobile device 240 through a local network, for example, via Bluetooth, Z-wave, or other wireless communication protocol. In some cases, the hub 257 and the mobile device 240 may communicate through a wired port or connection.

Figure 4A:
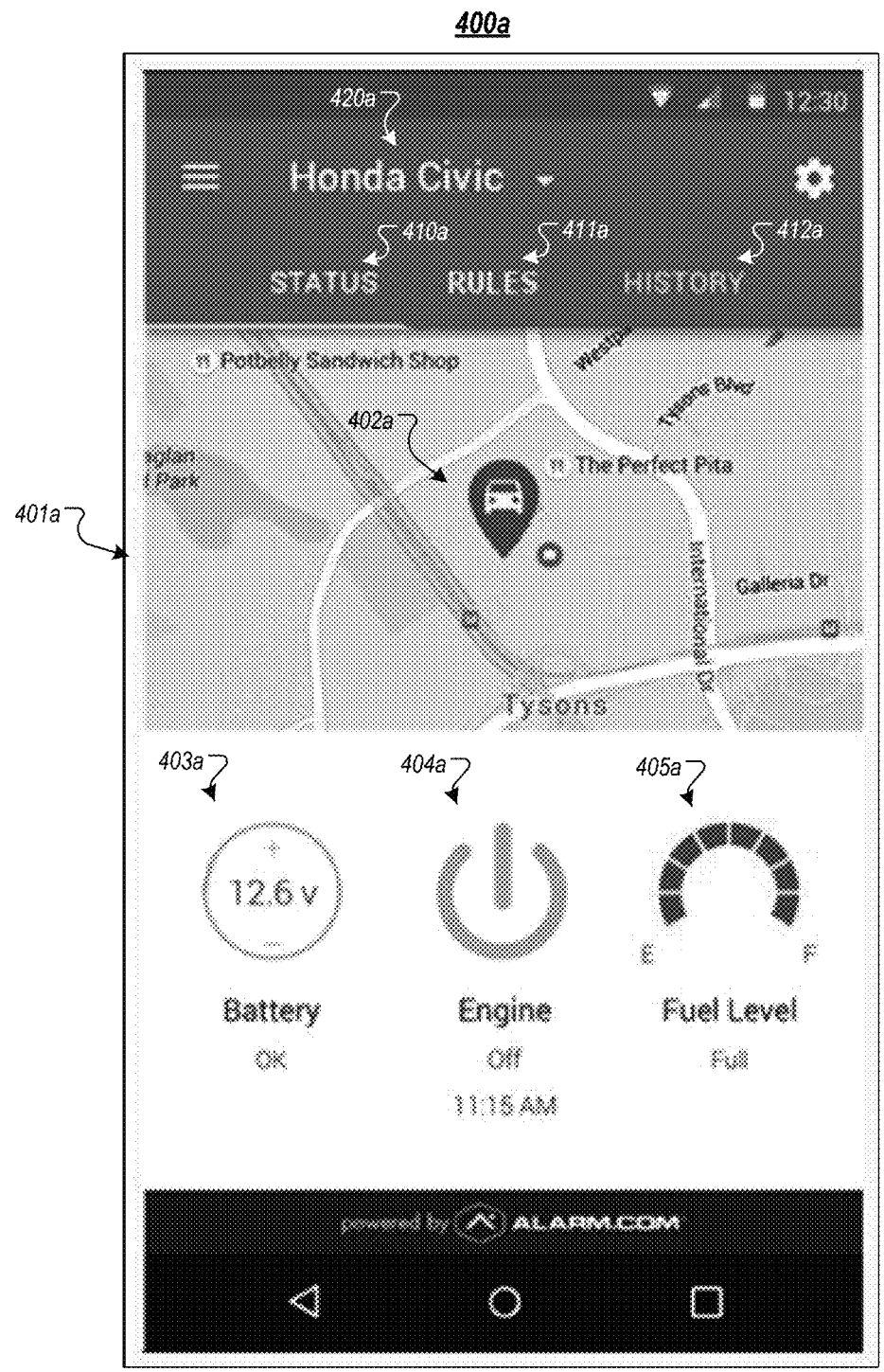
FIGS. 4A and 4B are diagrams illustrating example of user interfaces for vehicle monitoring.
Figure 4B:
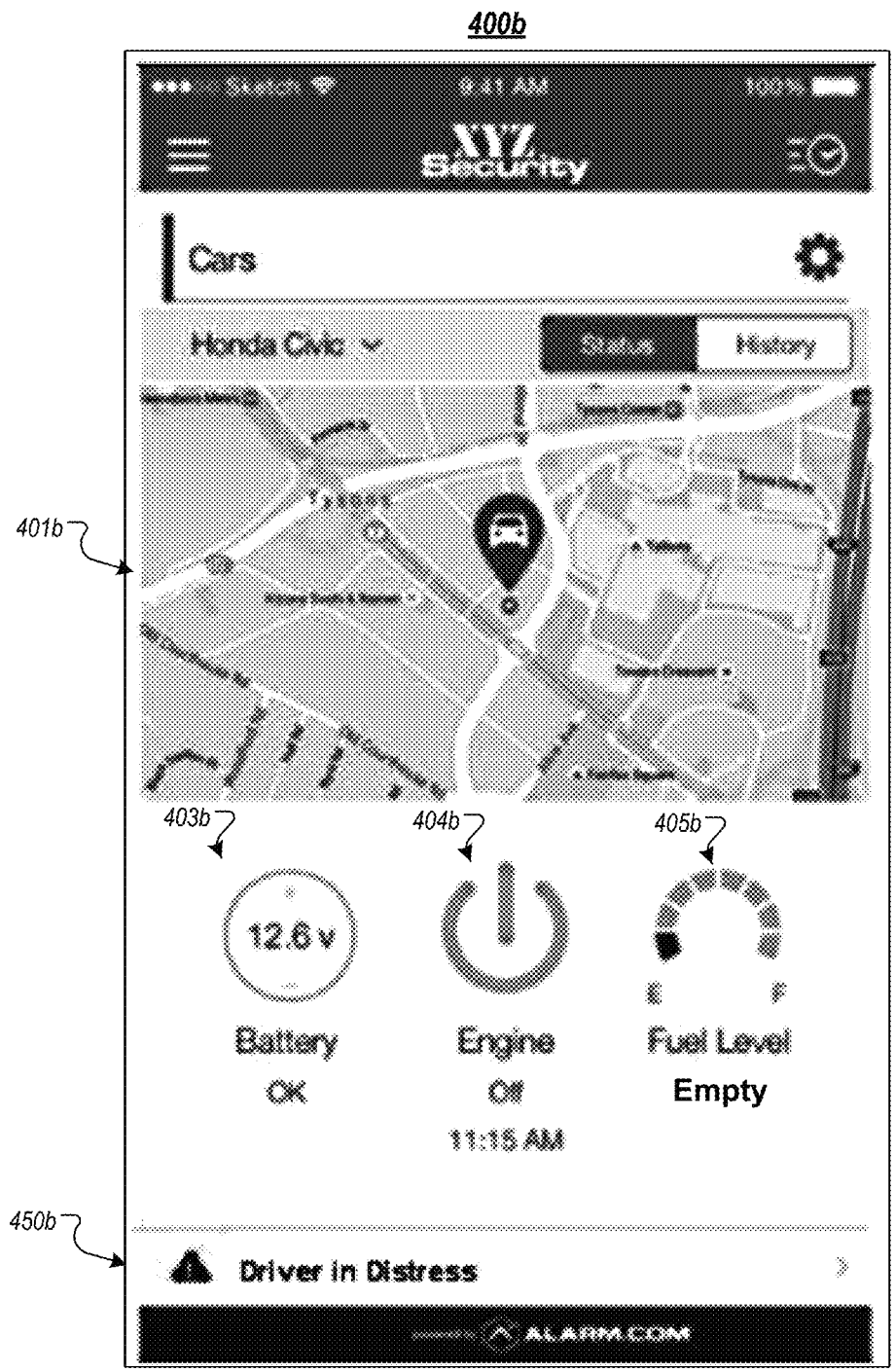

Here, the automation hub 257 sends vehicle data to the user mobile device 240. The mobile device 240 then stores, processes, or analyzes the data. The mobile device 240 may send some or all of the received, processed, or generated data to the monitoring server 260 through the data network 215. In some implementations, the user mobile device 240 may be configured to allow a user to view vehicle data provided by the automation hub 257, for example, data related to the vehicle location or condition (e.g., battery charge, fuel level, maintenance status). Examples of user interfaces for viewing vehicle data are shown in FIGS. 4A and 4B.

In some implementations, for non-emergency cases, the mobile device 240 may store some or all of the vehicle data and wait to send the data to the monitoring server 260 until the mobile device 240 is in range of a wireless network 205. The wireless network 205 may be, for example, a local area network (LAN), through which the mobile device 240 and the monitoring server 260 can communicate via WiFi. In some examples, the mobile device 240 may upload the data to the monitoring server 260 automatically when it is within range of a WiFi connection point. In some examples, the user of the mobile device 240 can direct the device to upload vehicle data by inputting a command to the mobile device 240. By sending data to the monitoring server 260 over the wireless network 205 rather than the data network 215, the user of the mobile device 240 may avoid or minimize the charges for data transmission that often accompany wireless consumer data plans for smart phones and other mobile computing devices.

In some implementations, the automation hub 257 or the mobile device 240 transmits data a low data rate when no event is detected or the vehicle status is normal use, but at a higher data rate when an event is detected or the vehicle status is misuse or in distress. For example, when the vehicle status is normal use and no triggering event is detected, the automation hub 257 may transmit data to the monitoring server 260 at regular intervals (e.g., once per minute), or stream image data acquired from a camera 254 at a low frame rate (e.g., five frames per second). When the vehicle status is in distress or misuse, the monitoring server 260 may stream image data at a higher frame rate (e.g., ten or more frames per second).

In some implementations, the automation hub 257 or the mobile device 240 sends data to the monitoring server 260 when the automation hub 257 detects a particular potential event. For example, the automation hub 257 or the mobile device 240 may immediately send vehicle data to the monitoring server 260 when the automation hub 257 detects a potential vehicle accident, a break-in, a crossing of a geofence, or any potential event associated with a vehicle status of in distress or misuse. In some examples, a user of the mobile device 240 may initiate transmission of vehicle data from the automation hub 257 or the mobile device 240 by providing a command to the mobile device 240.

The data recording and transmission settings of the automation hub 257 and/or the user mobile device 240 can be configurable by a vehicle owner or other authorized user. In some implementations, a user may configure the data settings of the automation hub 257 using a software application installed on their mobile device 240 that communicates with the monitoring server 260.

For example, the vehicle owner may configure the automation hub 257 to record various types of vehicle data whenever the vehicle 255 is in motion, store the data locally in a memory system of the automation hub 247, then upload the data to the authorized user mobile device 240. The user may also configure settings enabling the user device 240 to automatically upload vehicle data to the server 260 when it is within range of a WiFi LAN network 205. In some examples, the server 260 may send a message to the user device 240 asking whether stored vehicle data should be uploaded.

In some examples, the user can configure which events trigger the automation hub 257 or mobile device 240 to send data. For example, a user may configure the automation hub 257 or mobile device 240 to automatically send data to the monitoring server when the vehicle status is in distress, but not when it is misuse.

In addition to receiving vehicle data from the automation hub 247 and/or the mobile device 240, the monitoring server 260 may also receive property data related to the property 102. The property data can include, for example, data recorded by one or more sensors, controls, or other devices connected to the property monitoring system and located on the property 102. The property data can also include other received or generated monitoring system data, including alarm events, property monitoring system status (home, away, alarmed, etc.).

After receiving the vehicle and/or property data 262, the monitoring server 260 processes the data to determine and perform an action. In some implementations, the monitoring server 260 includes an analysis engine 264 that analyzes and processes the data. In some examples, the analysis engine includes one or more machine learning models that are trained on various combinations of vehicle and property data 262.

After receiving the vehicle and property data 262, the analysis engine 264 processes the data 262. For example, the analysis engine 264 may process the data to verify, modify, or detect a potential vehicle event or vehicle status.

In some examples, the analysis engine 264 may analyze video or image data recorded by a camera of the vehicle 155 or a camera located at the property 102 to verify a potential vehicle event or status. For example, the monitoring server 260 may analyze image data captured by a surveillance camera on the property 102 to determine that the vehicle 255 is parked outside of the house and there is no abnormal activity in or around the vehicle (e.g., no unauthorized persons after dark). As a result, the monitoring server 260 may verify the vehicle status as normal use.

In some implementations, the analysis engine 264 may process vehicle or property data to verify that the detected potential event is not a false detection. For example, based on the vehicle data indicating a sharp noise recorded by a microphone 256 of a vehicle 255 parked in a driveway of the property 202, the automation hub 247 may have identified a potential break-in event and set the vehicle status to misuse. The analysis engine 264 may then process image data captured by a dashboard camera 254 of the vehicle 255 or by a surveillance camera on the property 202 to confirm the break-in event and the vehicle status of misuse.

In some implementations, the monitoring server 260 may verify that the detected event is not a false detection by sending a message to a user mobile device 240 requesting confirmation of the detected potential event.

In some implementations, the analysis engine 264 processes the data 262 using an adaptive model that learns over time. The model may be, for example, a machine learning model. In some cases, the machine learning model may be trained on labeled vehicle and property data 262. In some cases, the monitoring server 260 may incorporate feedback from a user to improve the performance of the analysis engine 264. For example, based on a confirmation of a detected potential event received from a user, the monitoring server 260 may update the training data used to train the analysis engine 264.

The analysis engine 264 also applies one or more rules 263 to determine a monitoring system or vehicle action 265. For example, the analysis engine 264 may apply a rule 263 that indicates that, when the analysis engine 264 confirms the vehicle status is misuse, the server 260 should send a notification to an authorized user mobile device 240.

Figure 5:
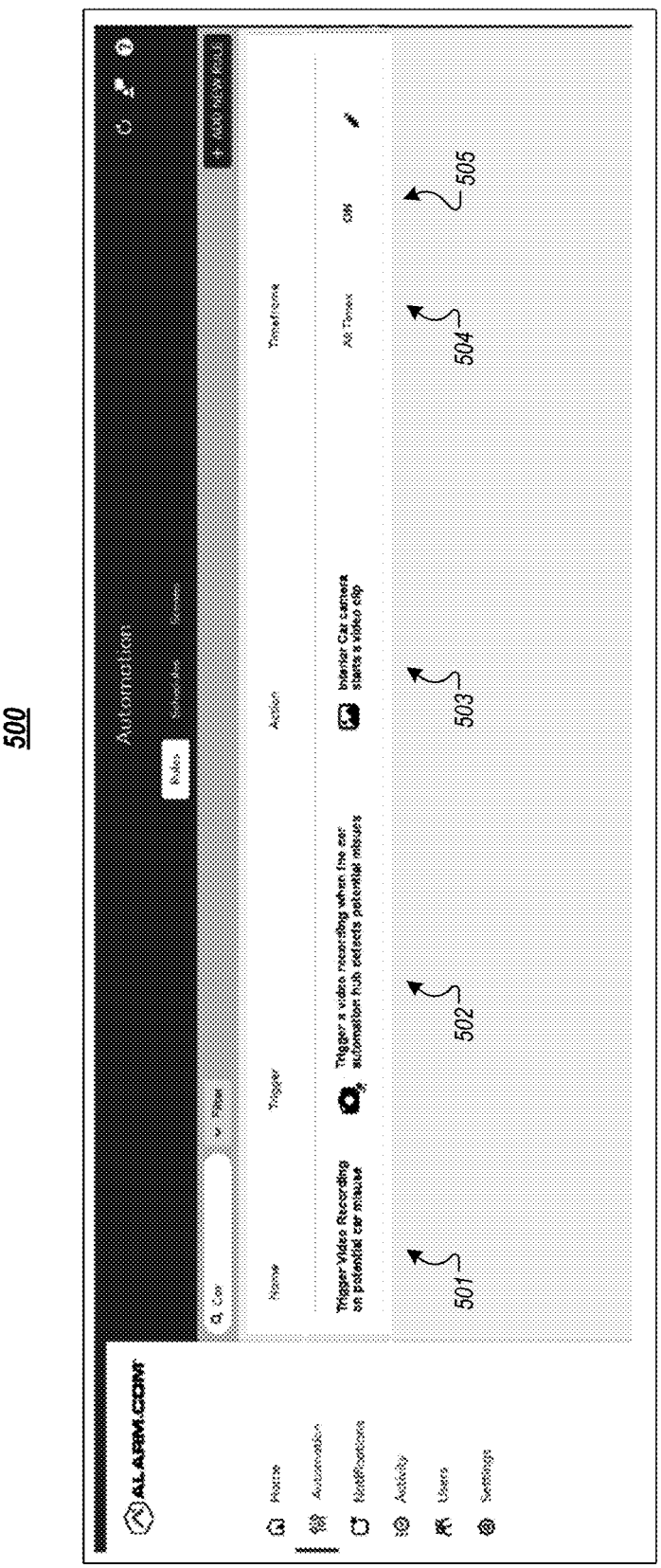
FIG. 5 is a diagram illustrating an example of a user interface for configuring vehicle monitoring.

The one or more rules 263 may be determined based on any of various inputs. The rules 263 may be based on the one or more detected potential events, the vehicle status, the property monitoring system security status, the time or day, the outdoor temperature or weather, or any other vehicle or property data. In some examples, the rules 263 may be configurable by a vehicle or property owner, or another authorized user. Here, the owner or user may specify the particular actions 265 that the monitoring server performs in response to detection of a particular event, a vehicle status, or a particular combination of vehicle and/or property data. In some implementations, a user can configure one or more rules 263 through a user interface displayed on a computing device. An example of a user interface for configuring one or more rules 263 for vehicle monitoring is shown in FIG. 5.

In some examples, the rules 263 may be predetermined (e.g., default rules) by the monitoring system. In some examples, the rules 263 can be stored in a local memory system of the monitoring server 260. In some examples, the rules 263 can be accessed by the monitoring server 260 by communicating with a remote computer system.

The monitoring server 260 may then perform one or more actions 265. The actions 265 can include, for example, sending a command to one or more devices of the property monitoring system, sending a message to one or more user mobile devices, sending a command to one or more sensors or controls of the vehicle 255 through the automation hub 257, and contacting emergency services personnel, such as roadside assistance or medical personnel.

In some implementations, a monitoring server may perform different actions for different vehicle statuses. FIGS. 3A, 3B, and 3C are diagrams illustrating three example scenarios of vehicle monitoring where the vehicle status is determined to be normal use, in distress, and misuse, respectively. These are not limiting examples; many other scenarios are possible and contemplated by the present disclosure.

Scenario 300 of FIG. 3A is an example of monitoring a vehicle with a vehicle status of normal use. In scenario 300, the monitoring server performs a set of actions at the home in response to detecting that a monitored vehicle is arriving home under normal use conditions and there are no occupants in the home.

In scenario 300, the monitoring server receives vehicle data from the vehicle's automation hub that includes GPS data, a potential arriving home event, and a vehicle status of normal use. Based on the GPS data, the server verifies that the vehicle is within a predetermined geographic region surrounding the home (e.g., by applying a geofence that was configured by the vehicle owner). Based on camera data from a camera on the property, the server determines that the vehicle is approaching a garage on the property.

The server also receives data from motion detectors, cameras, thermostat settings and system status settings indicating that the home is unoccupied. Based on the vehicle and property data, the monitoring server does not detect any adverse events, and so confirms the vehicle status of normal use.

Based on detecting that the vehicle is arriving home, the home is unoccupied, and the vehicle status is normal use, the monitoring server performs a set of actions preparing the home for the owner's arrival, including opening a garage door of the property, turning on interior or exterior lights of the property, and setting a home thermostat. In some examples, the server may display vehicle data (e.g., vehicle status, detected potential event) on a panel of a control unit in the home, as shown in FIG. 3A. In other examples, the server may determine and perform actions without displaying vehicle data on a control unit.

Scenario 320 of FIG. 3B is an example of monitoring a vehicle with an alarm status of in distress. In scenario 320, the monitoring server performs a set of actions in response to detecting that a monitored vehicle has potentially experienced an accident.

In scenario 320, the monitoring server receives from the vehicle's automation hub data from an OBD device, accelerometer data, audio data from a microphone in the vehicle cabin, and image data from a dashboard camera of the vehicle. The automation hub also provides data indicating a potential collision event and a vehicle status of in distress. The monitoring server analyzes the data to determine that the driver applied hard braking, the vehicle quickly decelerated, there was sharp noise in the vehicle cabin, and the vehicle appears to be contact with another automobile. Based on analyzing the vehicle data, the monitoring server confirms that the vehicle has potentially experienced a collision and the vehicle status should be in distress.

Based on verifying the potential accident, the monitoring server sends a notification to an authorized user mobile device asking if the vehicle experienced an accident and if the driver is in need of aid. If the user of the mobile device provides a response indicating that aid is necessary, the server may contact emergency services personnel. In some implementations, if the server does not receive a response from the user mobile device after a predetermined period of time, the server may automatically contact emergency service personnel. In some examples, the server may connect directly to a communication system (e.g., a speaker) of the vehicle to enable a third party, for example, a security guard, alarm monitor, or emergency service provider, to communicate with an occupant of the vehicle.

In scenario 320, the server may also provide various other information to the authorized user mobile device, including insurance contact and policy information, information regarding nearby service stations, repair shops, or hospitals. In some examples, the server may automatically download and/or store vehicle sensor data related to the detected event, including any video, audio, or other vehicle data.

Scenario 340 of FIG. 3C is an example of monitoring a vehicle with a vehicle status of misuse. In scenario 340, the monitoring server performs a set of actions in response to determining that a monitored vehicle has potentially been broken into by a thief or vandal.

In scenario 340, the monitoring server receives vehicle data from the vehicle's automation hub audio data from a vehicle microphone, data from an alarm of the vehicle, GPS data, detection of a potential break-in event, and a vehicle status of misuse. The server also receives property data that includes image data from a camera at the property and data from a computer system indicating that it is midnight.

By analyzing the vehicle data, the monitoring server determines that a sharp noise was detected, an alarm of the vehicle sounded, and the vehicle is parked in a driveway of the property. By analyzing the image data from the camera on the property, the monitoring server determines that a person is near the vehicle. Based on the analyses, the monitoring server verifies the potential break-in event and vehicle status of misuse.

Based on detecting a potential break-in, the monitoring server triggers recording by a camera of the vehicle, turns on outdoor lights, sounds a home alarm, and sends a notification to an authorized user mobile device. In some examples, the server may contact a security guard or the police.

In some implementations, the monitoring server can enhance the safety and security of the vehicle or vehicle owner by warning of potential distress or misuse. For example, similar to scenario 300, based on GPS location information from the vehicle automation hub, the monitoring server may confirm that the vehicle is arriving home. Based on the confirmation, the monitoring server may activate a surveillance mode, which triggers one or more sensors of the vehicle or the property to monitor the environment surrounding the vehicle and home. For example, the monitoring server may trigger a camera on the property, as well as a camera on the vehicle, to record image data. The monitoring server can analyze the image data to detect whether any dangerous conditions exist that would present a hazard to the vehicle owner when they exit the vehicle. If the monitoring server detects a dangerous condition, it can send a notification to a mobile device of the vehicle owner alerting them of the dangerous condition and warning them not to exit their vehicle. In some implementations, the monitoring server may set a vehicle status that triggers other actions (e.g., notifies a central alarm server, sounds an audible alarm, contacts emergency services).

For example, the monitoring server may analyze image data from a camera of the vehicle and/or a camera of the property to determine that there is likely a person crouching behind a shrub on the property. In some examples, the image may be captured by a camera mounted on a drone or other robotic device connected to the property monitoring system. The monitoring server may send a notification to the vehicle owner's mobile device indicating that it detected another person on the property and warning that the pose of the person (e.g., crouching behind a shrub) may indicate a dangerous condition. The vehicle owner can then choose their course of action (e.g., drive away from the property and contact emergency services if they believe the person presents danger; park and exit the vehicle if they believe the person does not present danger, for instance, if they know the person behind the shrub is a gardener). In some implementations, the vehicle owner may indicate their course of action to the monitoring server, e.g., by confirming or rejecting the notification of dangerous conditions.

In some examples, in response to the notification of a possible dangerous condition, the vehicle owner can set a preliminary vehicle status, which includes a time period (e.g., five minutes) and a specified action (e.g., inputting a command to their mobile device, turning off the vehicle automation hub, etc.). After setting the preliminary vehicle status, if the vehicle owner performs the specified action within the time period, the preliminary alarm is cancelled and the monitoring server continues normal monitoring functions. However, if the vehicle owner does not perform the specified action within the time period, the monitoring server may elevate the preliminary vehicle status to a regular vehicle status and take action accordingly (e.g., sound an audible alarm, notify security guards, contact emergency services, etc.).

In some implementations, the analysis engine of the monitoring server may detect a dangerous condition using a machine learning model. For example, the analysis engine may be trained using a labeled set of images depicting humans in various poses (e.g., walking, running, crouching, lying down, etc.) to determine whether a person detected on the property poses a danger to the vehicle owner. The analysis engine can incorporate feedback from the vehicle owner to improve the accuracy of its detection. For example, if the vehicle owner rejects the dangerous condition notification, the analysis engine can designate the detection as a false-positive and retrain the model to arrive at the correct detection. In some cases, the analysis engine can prompt the vehicle owner to provide additional information used in model training. For example, the analysis engine may prompt the vehicle owner to provide a reason for the rejection (e.g., no human present; human present but not dangerous).

In some implementations, one or more cameras of the vehicle or of the property may be infrared or thermal-imaging cameras. Thermal imaging cameras can allow the detection of persons on the property or near the vehicle in conditions where visible light cameras are insufficient for detection (e.g., dark or low-light conditions, when other objects obscure the person). Thermal imaging cameras may allow detection of dangerous persons independent of the time of day or when the person is hiding behind objects that do not emit infrared heat energy.

FIGS. 4A and 4B are diagrams illustrating examples of user interfaces 400a, 400b for vehicle monitoring. The interfaces 400a, 400b may be provided by a monitoring server to an authorized user mobile device, for example, as part of a software application installed on the user mobile device. In some examples, the monitoring server may provide the interfaces to a display panel at the user's home (e.g., a display on a monitoring system control unit). The interfaces 400a, 400b display the condition of the vehicle to the user, where that condition may depend on the vehicle status.

FIG. 4A depicts an example user interface 400a displaying the condition of a vehicle whose status is normal use. The interface 400a includes a display 401a indicating the current location of the vehicle. In this example, the display 401a includes a map with a pointer 402a indicating the geographic location of the vehicle. The monitoring server may determine the location of the vehicle by receiving location data (e.g., GPS coordinates) from the vehicle automation hub.

The interface 400a also includes indicators 403a, 404a, and 405a that show the status of various vehicle data and settings. In this example, indicator 403a shows that the vehicle battery is fully charged (12.6 V), indicator 404a shows that the vehicle engine is turned off, and indicator 405a shows that the fuel tank is filled. The interface 400a can include indicators showing the status of other vehicle data, including, but not limited to, current vehicle speed, maintenance status (e.g., whether maintenance is required), or the vehicle's fluid levels (e.g., coolant, oil, brake fluid, etc.).

The interface 400a also includes controls for selecting the data displayed on the interface. In FIG. 4A, the status control 410a is currently selected, giving rise to the status data displayed in the interface. Alternatively, the user can select the rules control 411a to view an interface that allows the user to view and modify the various rules the monitoring server applies to determine vehicle or monitoring system actions. The user can select the history control 412a to view data related to previous vehicle conditions, vehicle status, or events (e.g., a list or log of detected conditions, statuses, or events over a specified time period in the past).

In some examples, a user of the mobile device may own more than one vehicle that is monitored by the monitoring system. In that case, the interface 400a also includes a vehicle control 420a allowing a user to which vehicle's data is displayed.

FIG. 4B depicts an example user interface 400b displaying the condition of a vehicle whose vehicle status is in distress. Similar to the interface for the normal use status vehicle, interface 400b includes a display 401b indicating the current location of the vehicle, and indicators 403b, 404b, and 405b that show the status of various vehicle data and settings. In this example, indicator 403b shows that the vehicle battery is fully charged (12.6 V), indicator 404b shows that the vehicle engine is turned off, and indicator 405b shows that the fuel tank is empty. As for the normal use status, the interface 400b can include indicators showing the status of various other vehicle data.

The interface 400b also includes a message bar 450b for providing notifications to the user mobile device. For example, the message bar 450b can display a message indicating that the vehicle is in distress. In some examples, the message bar 450b may indicate the particular event detected (e.g., fuel tank empty, accident detected).

FIG. 5 is a diagram illustrating an example of a user interface 500 for configuring vehicle monitoring. The interface 500 may be provided by a monitoring server to an authorized user mobile device, for example, as part of a software application installed on the user mobile device. In some examples, the monitoring server may provide the interface 500 to a mobile device or another computing system as a webpage or through a browser. The interface 500 allows a user to configure one or more rules related to vehicle monitoring.

The interface 500 allows a user to create, view, or modify one or more custom rules related to monitoring a particular vehicle. The monitoring system then uses one or more custom rules, in addition to any predetermined default rules, for determining one or more actions to perform.

For each rule, the interface 500 provides fields for the user to specify a rule name 501, a triggering condition 502, a resulting action 503, and a timeframe 504 when the rule should be applied. In some implementations, the interface 500 may provide a drop-down menu to allow a user to select a triggering condition 502, an action 503, and a time frame 504 from among a set of predetermined options. According to the rule, when the particular triggering condition 502 occurs within the timeframe 504, the monitoring server will initiate the action 503.

In the example of FIG. 5, a user has created a rule for triggering video recording on potential misuse. The user has selected a triggering condition 502 of detection, by the automation hub, of potential vehicle misuse. The resulting action 503 is initiating recording of a video clip by the interior car camera, and the timeframe is set to all times, indicating that the rule is to be applied whenever potential vehicle misuse is detected by the automation hub. Alternatively, if the user wanted the monitoring server to only apply the rule to potential vehicle misuse detected after dark, they could set the timeframe to "night time," or indicate a daily start and stop time (e.g., 8:00 PM to 7:00 AM) to specify the times during which the rule would be enforced.

The interface 500 also includes a control 505 allowing a user to activate or deactivate a particular rule. By deactivating a rule, the user can instruct the monitoring server to disregard (e.g., to not apply) the rule until it is reactivated.

Figure 6:
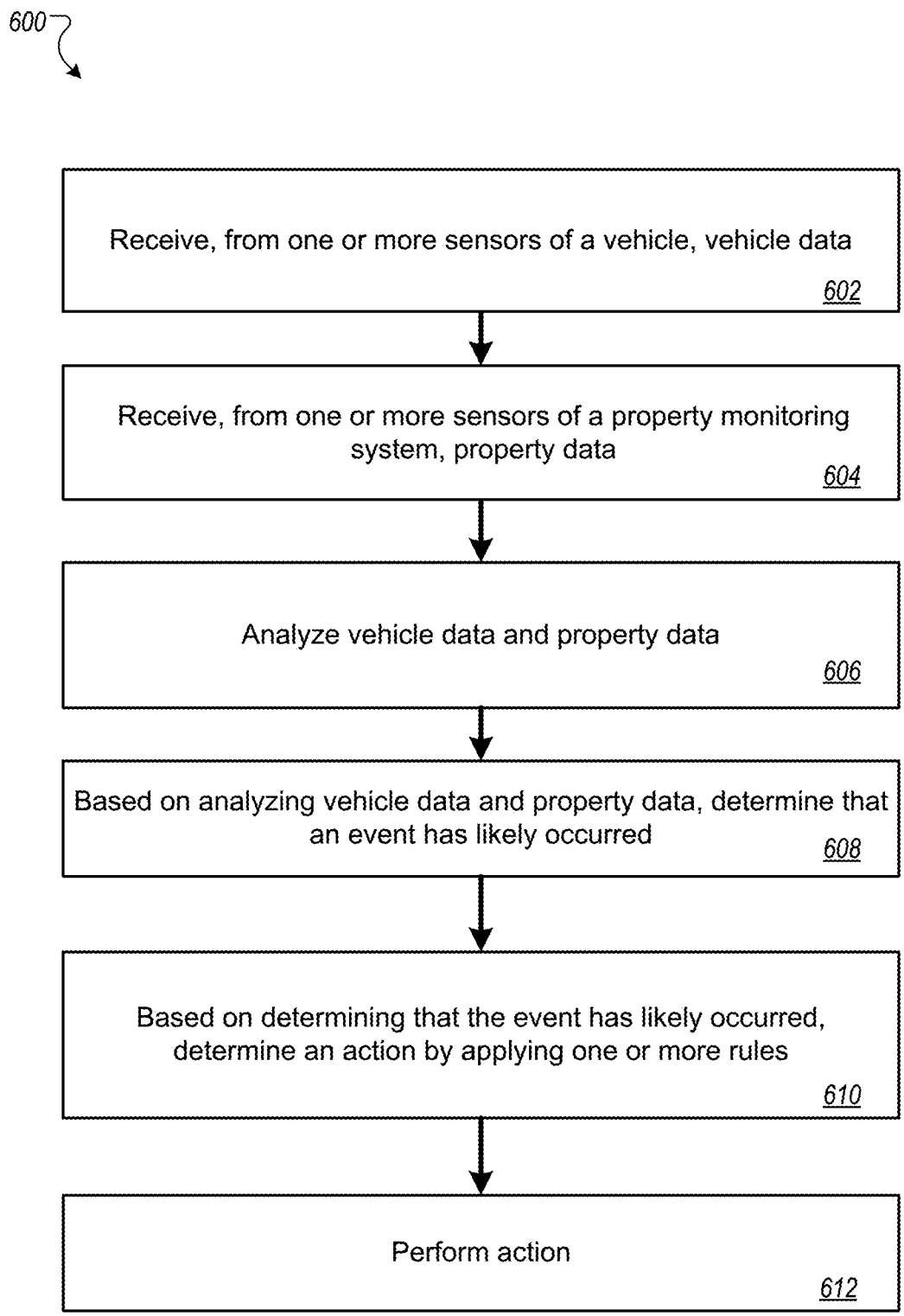
FIG. 6 is a flow chart illustrating an example method for vehicle monitoring.

FIG. 6 is a flow chart illustrating an example method 600 for vehicle monitoring. The method 600 can be performed, for example, by the monitoring server or by another computer system.

The method 600 includes receiving, from one or more sensors of a vehicle, vehicle data (602). The monitoring server can receive vehicle data from an automation hub of the vehicle or from a user mobile device that has received vehicle data from the automation hub.

The vehicle data can include any of various data related to the status, performance, condition, or location of the vehicle. The vehicle data can include data from an OBD device that communicates with a computer system of the vehicle or location data from a GPS receiver located in the vehicle. The vehicle data can also include data collected by sensors in the vehicle, for example, one or more cameras mounted in or on the vehicle, a microphone in the cabin of the vehicle, or an accelerometer of the vehicle.

In some examples, the vehicle data may include data generated by the automation hub. For instance, the vehicle data can include a vehicle status (e.g., normal use, in distress, misuse), a detected potential vehicle event (e.g., arriving home, potential accident, potential break-in), or other generated data.

The method 600 also includes receiving, from one or more sensors of a property monitoring system, property data (604). The monitoring server may receive the property data from a control unit of the monitoring system located at the property. The property data can include, for example, image or video data captured by one or more cameras on the property, motion sensing data from a motion detector on the property, or other sensor data. The property data can indicate the status of doors or windows (e.g., opened, closed, locked, unlocked), lights (e.g., on, off), or other appliances or devices. The property data can include the monitoring system status (e.g., armed, disarmed, home, away). In some implementations, the property data can include data received from one or more drones or robotic devices connected to the property monitoring system.

After receiving the data, the monitoring server analyzes the vehicle data and property data (606). In some implementations, the monitoring server may include an analysis engine that includes one or more machine learning models. In some examples, the monitoring server may analyze the data to verify the vehicle status or potential detected event provided to the server by the automation hub.

Based on analyzing the vehicle data and the property data, the monitoring server determines that an event has likely occurred (608). For example, the monitoring server can determine that the vehicle is likely arriving home, requires regular maintenance, is low on fuel, or any of various events that may correspond to normal use scenarios. The monitoring server can also determine that the vehicle or driver may be in distress. For example, the server can determine that a collision has likely occurred, that the car may be stranded (e.g., the fuel tank is empty), or that the driver may be unresponsive or incapacitated (e.g., for failing to respond to a message sent to a user device). In some examples, the monitoring server can determine that the vehicle may be misused. For example, the server may determine that the vehicle has experienced a break-in, that it is being driven recklessly, or that it has been driven outside of an authorized geographic region.

Based on determining that the event has likely occurred, the monitoring server determines one or more actions by applying one or more rules (610). The actions may be any of various monitoring system or vehicle actions and include sending a command to a monitoring system device to perform an action (e.g., to open a door, turn on or off an appliance, initiate recording of a camera, change the security status of the monitoring system, sound an audible alarm) or sending a command to the vehicle automation hub to perform a vehicle action (e.g., to initiate recording of a vehicle sensor, to store or send vehicle data, to activate a communication system of the vehicle). In some implementations, the action may be to send a message, alert, or notification to an authorized user mobile device. In some implementations, the action may be to alert and provide information to a third party, for example, a security guard or emergency services personnel.

After determining the one or more actions, the monitoring server then performs the actions (612). In some implementations, the monitoring server may perform a series of actions that depend upon a user response. For example, based on determining that a collision has likely occurred, the monitoring server may send a notification to an authorized user mobile device asking the user to confirm whether an accident occurred and if the driver would like roadside assistance or emergency services. If the user provides a response indicating that no collision has occurred, the server may determine that the collision detection was a false positive, update the training data, and retrain a machine learning model used by the analysis engine. If the user provides a response indicating that a collision has occurred and they would like roadside assistance, the server may provide to the user mobile device a list of towing companies near the location of the vehicle. If the user does not provide any response within a predetermined period of time, the server may contact emergency services personnel.

In some implementations, the system may access and leverage a rear-view camera on a vehicle to assist in determining the status of the vehicle. In other words, the system can integrate the vehicle communication module that transmits information taken by the in-built car rear-view camera to a cloud based backend service for processing and transmission to external devices. In this instance, the system is able to continuously access the image data from the rear-view camera instead of the rear-view camera only streaming image data to a screen on the dashboard during reversing. The system may access the rear-view camera both when the car is operating and when the car is off. To power the rear-view camera while the camera is off, the vehicle automation hub may include a battery that is connected to the alternator. The included battery is able to power the rear-view camera while the camera is off. The communication module may operate the camera in a low power mode with a reduced frame rate and/or resolution. In some instances, the communication module may store and/or transmit the image data, which may depend on the power remaining in the battery or the normal/distress/misuse state of the vehicle.

The system may utilize the rear-view camera in different ways depending on the state of the vehicle. If the vehicle is in a normal state, then the use may depend on whether the vehicle is parked or moving. If the vehicle is parked, then the system may use the rear-view camera to take a baseline picture when the engine is turned off. This may happen each time the engine is turned off. The baseline picture identifies unique attributes about the surrounding area such as trees, buildings, and other cars. Periodically, the system compares the baseline picture to a picture current image captured by the rear-view camera. If there is a shift in angle and/or direction of focus, that may indicate a deviation from normal use to misuse. In some implementations, the image comparison technology may use a machine learning algorithm that may be continuously trained with user feedback on whether the image includes a shift in angle and/or direction of focus.

If the vehicle is in motion and during normal use, then the system may analyze the images captured by the rear-view camera to determine whether the vehicle is inside or crossing a road line. In instances where the system determines that the vehicle crossed a road line, the system may compare the timing of the line crossing to usage of a turn signal. If the two coincide, then the system may ignore the line crossing because the system determines that the driver likely intended to cross the line. If the vehicle crosses a line (e.g., white or yellow) and the line crossing does not coincide with using a signal indicator, then the system may increase the likelihood of changing to a distress state. If the vehicle continues to cross road lines without using a signal indicator, then the system may change to a distress state.

The system may be able to detect a distress state with the rear-view camera if the system detects large deviations (e.g., greater than twenty degrees) in angles (as defined by the road lines) occur in unconfined ways (e.g., not from one set of parallel lines to another). In other words, the system may determine that a car is swerving when detecting large changes in road line angles from images captured periodically, e.g., every second. If the car is swerving, then the system may change to a distress state.

Figure 7:
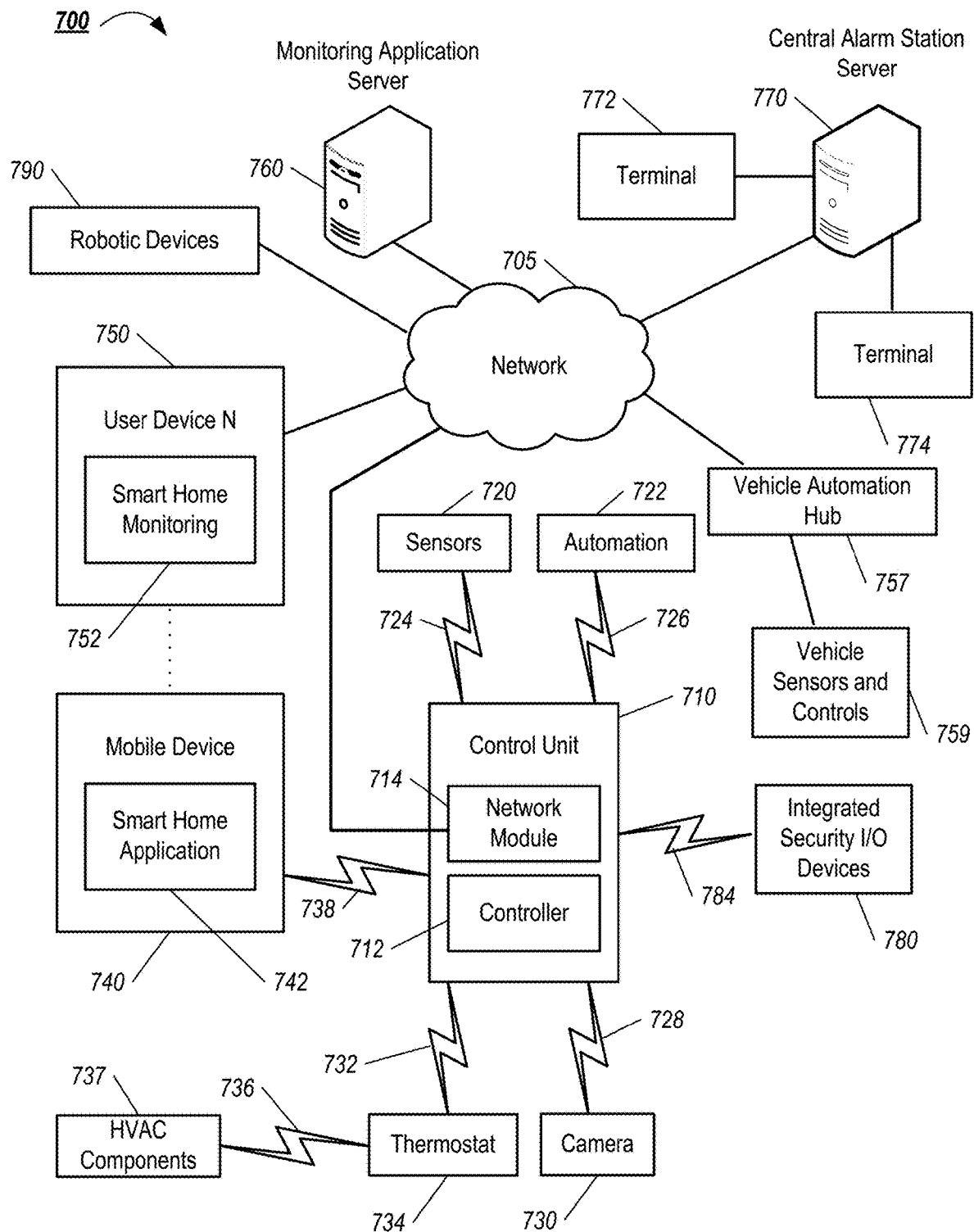
FIG. 7 is a diagram illustrating an example property monitoring system.

FIG. 7 is a block diagram of an example property monitoring system 700. The electronic system 700 includes a network 705, a control unit 710, one or more user devices 740 and 750, a monitoring server 760, and a central alarm station server 770. In some examples, the network 705 facilitates communications between the control unit 710, the one or more user devices 740 and 750, the monitoring server 760, and the central alarm station server 770.

The network 705 is configured to enable exchange of electronic communications between devices connected to the network 705. For example, the network 705 may be configured to enable exchange of electronic communications between the control unit 710, the one or more user devices 740 and 750, the monitoring server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, flow meters, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voice band modem configured to enable the alarm panel to communicate over the telephone lines of Plain Old Telephone Systems (POTS).

The control unit system that includes the control unit 710 includes one or more sensors. For example, the monitoring system may include multiple sensors 720. The sensors 720 may include a lock sensor, a contact sensor, a motion sensor, or any other type of sensor included in a control unit system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 720 may include a radio-frequency identification (RFID) sensor that identifies a particular article that includes a pre-assigned RFID tag.

The control unit 710 communicates with the module 722 and the camera 730 to perform monitoring. The module 722 is connected to one or more devices that enable home automation control. For instance, the module 722 may be connected to one or more lighting systems and may be configured to control operation of the one or more lighting systems. Also, the module 722 may be connected to one or more electronic locks at the property and may be configured to control operation of the one or more electronic locks (e.g., control Z-Wave locks using wireless communications in the Z-Wave protocol. Further, the module 722 may be connected to one or more appliances at the property and may be configured to control operation of the one or more appliances. The module 722 may include multiple modules that are each specific to the type of device being controlled in an automated manner. The module 722 may control the one or more devices based on commands received from the control unit 710. For instance, the module 722 may cause a lighting system to illuminate an area to provide a better image of the area when captured by a camera 730.

The camera 730 may be a video/photographic camera or other type of optical sensing device configured to capture images. For instance, the camera 730 may be configured to capture images of an area within a building or within a residential facility 102-A monitored by the control unit 710. The camera 730 may be configured to capture single, static images of the area and also video images of the area in which multiple images of the area are captured at a relatively high frequency (e.g., thirty images per second). The camera 730 may be controlled based on commands received from the control unit 710.

The camera 730 may be triggered by several different types of techniques. For instance, a Passive Infra-Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensors 720, PIR, door/window, etc.) detect motion or other events. In some implementations, the camera 730 receives a command to capture an image when external devices detect motion or another potential alarm event. The camera 730 may receive the command from the controller 712 or directly from one of the sensors 720.

In some examples, the camera 730 triggers integrated or external illuminators (e.g., Infra-Red, Z-wave controlled "white" lights, lights controlled by the module 722, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring server 760 over the Internet. In these implementations, image data captured by the camera 730 does not pass through the control unit 710 and the camera 730 receives commands related to operation from the monitoring server 760.

The system 700 also includes thermostat 734 to perform dynamic environmental control at the property. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a property and/or environmental data at a property, e.g., at various locations indoors and outdoors at the property. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the control unit 710 and can control the environmental (e.g., temperature) settings based on commands received from the control unit 710.

In some implementations, the thermostat 734 is a dynamically programmable thermostat and can be integrated with the control unit 710. For example, the dynamically programmable thermostat 734 can include the control unit 710, e.g., as an internal component to the dynamically programmable thermostat 734. In addition, the control unit 710 can be a gateway device that communicates with the dynamically programmable thermostat 734.

A module 737 is connected to one or more components of an HVAC system associated with a property, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

In some implementations, the system 700 includes a vehicle automation hub 757, which is installed in a vehicle. The automation hub 757 may communicate with the monitoring server 760 and/or the central alarm server 770 through the network 705 or through other means (e.g., another wireless data network).

The automation hub 757 is installed in a vehicle and may receive, analyze, and store data related to the vehicle. In some examples, the automation hub 757 communicates with a computer system of the vehicle, possibly through an on-board-diagnostic (OBD) device or connection. The automation hub 757 can communicate with the vehicle's computer system through any of various physical or electronic protocols and interfaces, including OBD-1, OBD1.5, OBD-II, or custom interfaces.

The automation hub 757 may also communicate with one or more sensors and/or controls 759 of the vehicle. The vehicle sensors and controls 759 can be integrated into the automation hub 757, can be separate devices, or can be part of a computer system of the vehicle. The automation hub 757 can receive any of various vehicle data from the sensors and controls 759, including engine or maintenance data, fuel level, motion data (e.g., speed, acceleration, location), air bag status, audio data, video or image data, GPS data, or other vehicle data.

In some implementations, the automation hub 757 can send commands to one or more vehicle sensors or controls 759. For example, the hub 757 can command a vehicle camera to begin recording, a vehicle alarm to sound, or a setting of the vehicle (e.g., a thermostat setting, a lock, a seat position) to assume a particular value.

In some examples, the system 700 further includes one or more robotic devices 790. The robotic devices 790 may be any type of robots that are capable of moving and taking actions that assist in property monitoring. For example, the robotic devices 790 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 790 may be robotic devices that are intended for other purposes and merely associated with the system 700 for use in appropriate circumstances. For instance, a robotic vacuum cleaner device may be associated with the monitoring system 700 as one of the robotic device 790 and may be controlled to take action responsive to monitoring system events.

In some examples, the robotic devices 790 automatically navigate within a property. In these examples, the robotic devices 790 include sensors and control processors that guide movement of the robotic devices 790 within the property. For instance, the robotic device 790 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic device 790 may include control processors that process output from the various sensors and control the robotic device 790 to move along a path that reaches the desired destination and avoids obstacles. In this regard, the control processors detect walls or other obstacles in the property and guide movement of the robotic device 790 in a manner that avoids the walls and other obstacles.

In addition, the robotic devices 790 may store data that describes attributes of the property. For instance, the robotic device 790 may store a floorplan and/or a three-dimensional model of the property that enables the robotic device 790 to navigate the property. During initial configuration, the robotic device 790 may receive the data describing attributes of the property, determine a frame of reference to the data (e.g., a home or reference location in the property), and navigate the property based on the frame of reference and the data describing attributes of the property. Further, initial configuration of the robotic device 790 also may include learning of one or more navigation patterns in which a user provides input to control the robotic device 790 to perform a specific navigation action (e.g., fly to an upstairs bedroom and spin around while capturing video and then return to a home charging base). In this regard, the robotic device 790 may learn and store the navigation patterns such that the robotic device 790 may automatically repeat the specific navigation actions upon a later request.

In some examples, the robotic devices 790 may include data capture and recording devices. In these examples, the robotic device 790 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic device 790 to take and store a biometric sample that can be used to identify the person (e.g., a biometric sample with DNA that can be used for DNA testing).

In some implementations, the robotic devices 790 may include output devices. In these implementations, the robotic devices 790 may include one or more displays, one or more speakers, and/or any type of output devices that allow the robotic device 790 to communicate information to a nearby user.

The robotic devices 790 also may include a communication module that enables the robotic devices 790 to communicate with the control unit 710, each other, and/or other devices. The communication module may be a wireless communication module that allows the robotic device 790 to communicate wirelessly. For instance, the communication module may be a Wi-Fi module that enables the robotic device 790 to communicate over a local wireless network at the property. The communication module further may be a 900 MHz wireless communication module that enables the robotic device 790 to communicate directly with the control unit 710. Other types of short-range wireless communication protocols, such as Bluetooth, Bluetooth LE, Z-wave, Zigbee, etc., may be used to allow the robotic device 790 to communicate with other devices in the property. In some implementations, the robotic devices 790 may communicate with each other or with other devices of the system 700 through the network 705.

The robotic devices 790 further may include processor and storage capabilities. The robotic device 790 may include any suitable processing devices that enable the robotic device 790 to operate applications and perform the actions described throughout this disclosure. In addition, the robotic device 790 may include solid state electronic storage that enables the robotic device 790 to store applications, configuration data, collected sensor data, and/or any other type of information available to the robotic device 790.

The robotic devices 790 are associated with one or more charging stations. The charging stations may be located at predefined home base or reference locations in the property. The robotic devices 790 may be configured to navigate to the charging stations after completion of tasks needed to be performed for the monitoring system 700. For instance, after completion of a monitoring operation or upon instruction by the control unit 710, the robotic device 790 may be configured to automatically fly to and land on one of the charging stations. In this regard, the robotic devices 790 may automatically maintain a fully charged battery in a state in which the robotic devices 790 are ready for use by the monitoring system 700.

The charging stations may be contact based charging stations and/or wireless charging stations. For contact based charging stations, the robotic devices 790 may have readily accessible points of contact that the robotic devices 790 are capable of positioning and mating with a corresponding contact on the charging station. For instance, a helicopter type robotic device 790 may have an electronic contact on a portion of its landing gear that rests on and mates with an electronic pad of a charging station when the helicopter type robotic device 790 lands on the charging station. The electronic contact on the robotic device 790 may include a cover that opens to expose the electronic contact when the robotic device 790 is charging and closes to cover and insulate the electronic contact when the robotic device 790 is in operation.

For wireless charging stations, the robotic devices 790 may charge through a wireless exchange of power. In these cases, the robotic devices 790 need only locate themselves closely enough to the wireless charging stations for the wireless exchange of power to occur. In this regard, the positioning needed to land at a predefined home base or reference location in the property may be less precise than with a contact based charging station. Based on the robotic devices 790 landing at a wireless charging station, the wireless charging station outputs a wireless signal that the robotic devices 790 receive and convert to a power signal that charges a battery maintained on the robotic devices 790.

In some implementations, each of the robotic devices 790 has a corresponding and assigned charging station such that the number of robotic devices 790 equals the number of charging stations. In these implementations, the robotic devices 790 always navigate to the specific charging station assigned to that robotic device 790. For instance, a first robotic device 790 may always use a first charging station and a second robotic device 790 may always use a second charging station.

In some examples, the robotic devices 790 may share charging stations. For instance, the robotic devices 790 may use one or more community charging stations that are capable of charging multiple robotic devices 790. The community charging station may be configured to charge multiple robotic devices 790 in parallel. The community charging station may be configured to charge multiple robotic devices 790 in serial such that the multiple robotic devices 790 take turns charging and, when fully charged, return to a predefined home base or reference location in the property that is not associated with a charger. The number of community charging stations may be less than the number of robotic devices 790.

Also, the charging stations may not be assigned to specific robotic devices 790 and may be capable of charging any of the robotic devices 790. In this regard, the robotic devices 790 may use any suitable, unoccupied charging station when not in use. For instance, when one of the robotic devices 790 has completed an operation or is in need of battery charge, the control unit 710 references a stored table of the occupancy status of each charging station and instructs the robotic device 790 to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices. Additionally, the one or more control units 710 may receive one or more sensor data from the sensors 720 and determine whether to provide an alert to the one or more integrated security input/output devices 780.

The sensors 720, the module 722, the camera 730, the thermostat 734, and the integrated security devices 780 communicate with the controller 712 over communication links 724, 726, 728, 732, 738, and 784. The communication links 724, 726, 728, 732, 738, and 784 may be a wired or wireless data pathway configured to transmit signals from the sensors 720, the module 722, the camera 730, the thermostat 734, and the integrated security devices 780 to the controller 712. The sensors 720, the module 722, the camera 730, the thermostat 734, and the integrated security devices 780 may continuously transmit sensed values to the controller 712, periodically transmit sensed values to the controller 712, or transmit sensed values to the controller 712 in response to a change in a sensed value.

The communication links 724, 726, 728, 732, 738, and 784 may include a local network. The sensors 720, the module 722, the camera 730, the thermostat 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 760 is an electronic device configured to provide monitoring services by exchanging electronic communications with the control unit 710, the one or more user devices 740 and 750, and the central alarm station server 770 over the network 705. For example, the monitoring server 760 may be configured to monitor events (e.g., alarm events) generated by the control unit 710. In this example, the monitoring server 760 may exchange electronic communications with the network module 714 included in the control unit 710 to receive information regarding events (e.g., alerts) detected by the control unit 710. The monitoring server 760 also may receive information regarding events (e.g., alerts) from the one or more user devices 740 and 750.

In some examples, the monitoring server 760 may route alert data received from the network module 714 or the one or more user devices 740 and 750 to the central alarm station server 770. For example, the monitoring server 760 may transmit the alert data to the central alarm station server 770 over the network 705.

The monitoring server 760 may store sensor and image data received from the monitoring system and perform analysis of sensor and image data received from the monitoring system. Based on the analysis, the monitoring server 760 may communicate with and control aspects of the control unit 710 or the one or more user devices 740 and 750.

The monitoring server 760 may provide various monitoring services to the system 700. For example, the monitoring server 760 may analyze the sensor, image, and other data to determine an activity pattern of a resident of the property monitored by the system 700. In some implementations, the monitoring server 760 may analyze the data for alarm conditions or may determine and perform actions at the property by issuing commands to one or more of the controls 722, possibly through the control unit 710.

The central alarm station server 770 is an electronic device configured to provide alarm monitoring service by exchanging communications with the control unit 710, the one or more mobile devices 740 and 750, and the monitoring server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more mobile devices 740 and 750, the vehicle automation hub 757, and/or the monitoring server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more user devices 740 and 750 are devices that host and display user interfaces. For instance, the user device 740 is a mobile device that hosts one or more native applications (e.g., the smart home application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a smart home application 742. The smart home application 742 refers to a software/firmware program running on the corresponding mobile device that enables the user interface and features described throughout. The user device 740 may load or install the smart home application 742 based on data received over a network or data received from local media. The smart home application 742 runs on mobile devices platforms, such as iPhone, iPod touch, Blackberry, Google Android, Windows Mobile, etc. The smart home application 742 enables the user device 740 to receive and process image and sensor data from the monitoring system.

The user device 750 may be a general-purpose computer (e.g., a desktop personal computer, a workstation, or a laptop computer) that is configured to communicate with the monitoring server 760 and/or the control unit 710 over the network 705. The user device 750 may be configured to display a smart home user interface 752 that is generated by the user device 750 or generated by the monitoring server 760. For example, the user device 750 may be configured to display a user interface (e.g., a web page) provided by the monitoring server 760 that enables a user to perceive images captured by the camera 730 and/or reports related to the monitoring system. Although FIG. 7 illustrates two user devices for brevity, actual implementations may include more (and, perhaps, many more) or fewer user devices.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Z-wave, Zigbee, HomePlug (ethernet over power line), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring server 760) may be significantly slower.

Although the one or more user devices 740 and 750 are shown as communicating with the control unit 710, the one or more user devices 740 and 750 may communicate directly with the sensors and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring server 760 may relay data received from the control unit 710 to the one or more user devices 740 and 750 through the network 705. In this regard, the monitoring server 760 may facilitate communication between the one or more user devices 740 and 750 and the monitoring system.

In some implementations, the one or more user devices 740 and 750 may be configured to switch whether the one or more user devices 740 and 750 communicate with the control unit 710 directly (e.g., through link 738) or through the monitoring server 760 (e.g., through network 705) based on a location of the one or more user devices 740 and 750. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 only includes the one or more user devices 740 and 750, the sensors 720, the module 722, the camera 730, and the robotic devices 790. The one or more user devices 740 and 750 receive data directly from the sensors 720, the module 722, the camera 730, and the robotic devices 790 and sends data directly to the sensors 720, the module 722, the camera 730, and the robotic devices 790. The one or more user devices 740, 750 provide the appropriate interfaces/processing to provide visual surveillance and reporting.

In other implementations, the system 700 further includes network 705 and the sensors 720, the module 722, the camera 730, the thermostat 734, and the robotic devices 790 are configured to communicate sensor and image data to the one or more user devices 740 and 750 over network 705 (e.g., the Internet, cellular network, etc.). In yet another implementation, the sensors 720, the module 722, the camera 730, the thermostat 734, and the robotic devices 790 (or a component, such as a bridge/router) are intelligent enough to change the communication pathway from a direct local pathway when the one or more user devices 740 and 750 are in close physical proximity to the sensors 720, the module 722, the camera 730, the thermostat 734, and the robotic devices 790 to a pathway over network 705 when the one or more user devices 740 and 750 are farther from the sensors 720, the module 722, the camera 730, the thermostat 734, and the robotic devices 790. In some examples, the system leverages GPS information from the one or more user devices 740 and 750 to determine whether the one or more user devices 740 and 750 are close enough to the sensors 720, the module 722, the camera 730, the thermostat 734, and the robotic devices 790 to use the direct local pathway or whether the one or more user devices 740 and 750 are far enough from the sensors 720, the module 722, the camera 730, the thermostat 734, and the robotic devices 790 that the pathway over network 705 is required. In other examples, the system leverages status communications (e.g., pinging) between the one or more user devices 740 and 750 and the sensors 720, the module 722, the camera 730, the thermostat 734, and the robotic devices 790 to determine whether communication using the direct local pathway is possible. If communication using the direct local pathway is possible, the one or more user devices 740 and 750 communicate with the sensors 720, the module 722, the camera 730, the thermostat 734, and the robotic devices 790 using the direct local pathway. If communication using the direct local pathway is not possible, the one or more user devices 740 and 750 communicate with the sensors 720, the module 722, the camera 730, the thermostat 734, and the robotic devices 790 using the pathway over network 705.

In some implementations, the system 700 provides end users with access to images captured by one or more cameras 730 and/or a vehicle cameras 759 to aid in decision making. The system 700 may transmit the images captured by the cameras over a wireless WAN network to the user devices 740 and 750. Because transmission over a wireless WAN network may be relatively expensive, the system 700 uses several techniques to reduce costs while providing access to significant levels of useful visual information.

In some implementations, a state of the monitoring system and other events sensed by the monitoring system may be used to enable/disable video/image recording devices (e.g., the camera 730). In these implementations, the camera 730 and/or a vehicle camera 759 may be set to capture images on a periodic basis when the alarm system is armed in an "Away" state, but set not to capture images when the alarm system is armed in a "Home" state or disarmed. In addition, the camera 730 and/or the vehicle camera 759 may be triggered to begin capturing images when the alarm system detects an event, such as an alarm event, a door-opening event for a door that leads to an area within a field of view of the camera, or motion in the area within the field of view of the camera. In other implementations, the camera 730 and/or the vehicle camera 759 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
obtaining, at a first data transfer rate and by a monitoring system that is configured to monitor a property and from a vehicle automation hub configured to communicate with a computer system of a vehicle associated with the property when the vehicle is in a normal use mode, vehicle data that indicates an attribute of the vehicle;

obtaining sensor data captured by one or more sensors at the property;
determining, based on the vehicle data, a first condition of the vehicle at a first time;
determining, using the sensor data, that an event related to the property likely occurred;
accessing a set of rules including a first rule indicating a vehicle condition, an event condition related to a property, a timeframe of applicability, and one or more actions, wherein the one or more actions include transmitting, from the vehicle automation hub and to the monitoring system, additional vehicle data at a second data transfer rate, the second data transfer rate being higher than the first data transfer rate, wherein the set of rules includes rules for monitoring a plurality of vehicles including the vehicle, each vehicle being associated with one or more rules, included in the set of rules, that are for that vehicle, each rule being applicable to one or more of the plurality of vehicles, and at least a first vehicle associated with a different set of rules than a second vehicle;
selecting, from the set of rules and using data for the event related to the property that likely occurred and at least some of the vehicle data, the first rule in response to determining that i) the first rule is included in one or more rules for the vehicle ii) the first condition of the vehicle satisfies the vehicle condition indicated by the first rule, iii) the event that likely occurred satisfies the event condition related to the property, and iv) that the first time satisfies the timeframe of applicability indicated by the first rule; and
transmitting, to the vehicle automation hub, an instruction to cause the vehicle automation hub to adjust a configuration of one or more components of the vehicle using the first rule.

2. The method of claim 1:
wherein the vehicle data that indicates the attribute of the vehicle comprises:
braking data indicating a hard braking event; and
acceleration data indicating a rapid deceleration;
wherein determining, based on the vehicle data, the first condition of the vehicle at the first time comprises:
determining, based on the braking data and the acceleration data, that the vehicle has likely experienced a collision; and
wherein the instruction to cause the vehicle automation hub to adjust the configuration of the one or more components of the vehicle comprises an instruction to activate a camera in the vehicle.

3. The method of claim 1:
wherein the vehicle data that indicates the attribute of the vehicle comprises:
microphone data indicating a sound of glass breaking; and
speed data indicating that the vehicle is stationary;
wherein determining, based on the vehicle data, the first condition of the vehicle at the first time comprises:
determining, based on the microphone data and the speed data, that the vehicle has likely experienced a break-in; and
wherein the instruction to cause the vehicle automation hub to adjust the configuration of the one or more components of the vehicle comprises an instruction to activate an audible alarm of the vehicle.

4. The method of claim 1:
wherein the vehicle data that indicates the attribute of the vehicle comprises:
speed data indicating a vehicle speed that exceeds a threshold speed;
wherein determining, based on the vehicle data, the first condition of the vehicle at the first time comprises:
determining, based on analyzing the speed data, that the vehicle is likely being recklessly operated; and
wherein the instruction to cause the vehicle automation hub to adjust the configuration of the one or more components of the vehicle comprises an instruction to activate a communication system of the vehicle, wherein the communication system enables audio communication between a user of the monitoring system and an operator of the vehicle.

5. The method of claim 1, wherein the vehicle automation hub is configured to communicate with the computer system of the vehicle through an on-board diagnostic port.

6. The method of claim 1, wherein the vehicle data comprises data indicating at least one of a location, speed, acceleration, braking data, fuel level, oil level, engine condition, ignition condition, or required maintenance of the vehicle.

7. The method of claim 1, wherein the attribute of the vehicle comprises data indicating an event related to the vehicle.

8. The method of claim 7, wherein the event related to the vehicle comprises at least one of a hard braking event, a rapid deceleration event, or an airbag deployment event.

9. The method of claim 1, wherein the vehicle automation hub is configured to communicate with one or more sensors installed at the vehicle.

10. The method of claim 9, wherein the one or more sensors installed at the vehicle comprise at least one of an accelerometer, a camera, a microphone, or a GPS receiver.

11. The method of claim 1, wherein the instruction to cause the vehicle automation hub to adjust the configuration of the one or more components of the vehicle comprises an instruction to adjust a configuration of at least one of a camera, a microphone, an audible alarm, a communication system, or a dashboard display panel.

12. The method of claim 1, comprising:
receiving, through a user interface of a computing device in communication with the monitoring system, user input specifying the vehicle condition, the timeframe of applicability, and the one or more actions of the first rule.

13. The method of claim 1, wherein each rule of the set of rules has an activated or deactivated state specified by user input, the method comprising selecting the first rule based at least in part on the first rule having an activated state.

14. A system comprising one or more computers and one or more storage devices on which are stored instructions that are operable, when executed by the one or more computers, to cause the one or more computers to perform operations comprising:
obtaining, at a first data transfer rate and from a vehicle automation hub configured to communicate with a computer system of a vehicle associated with a property when the vehicle is in a normal use mode, vehicle data that indicates an attribute of the vehicle;
obtaining sensor data captured by one or more sensors at the property;
determining, based on the vehicle data, a first condition of the vehicle at a first time;
determining, using the sensor data, that an event related to the property likely occurred;

accessing a set of rules including a first rule indicating a vehicle condition, an event condition related to a property, a timeframe of applicability, and one or more actions, wherein the one or more actions include transmitting, from the vehicle automation hub and to a monitoring system that is configured to monitor the property, additional vehicle data at a second data transfer rate, the second data transfer rate being higher than the first data transfer rate, wherein the set of rules includes rules for monitoring a plurality of vehicles including the vehicle, each vehicle being associated with one or more rules, included in the set of rules, that are for that vehicle, each rule being applicable to one or more of the plurality of vehicles, and at least a first vehicle associated with a different set of rules than a second vehicle;

selecting, from the set of rules and using data for the event related to the property that likely occurred and at least some of the vehicle data, the first rule in response to determining that i) the first rule is included in one or more rules for the vehicle ii) the first condition of the vehicle satisfies the vehicle condition indicated by the first rule, iii) the event that likely occurred satisfies the event condition related to the property, and iv) that the first time satisfies the timeframe of applicability indicated by the first rule; and transmitting, to the vehicle automation hub, an instruction to cause the vehicle automation hub to adjust a configuration of one or more components of the vehicle using the first rule.

15. The system of claim 14:

wherein the vehicle data that indicates the attribute of the vehicle comprises:
  braking data indicating a hard braking event; and
  acceleration data indicating a rapid deceleration;

wherein determining, based on the vehicle data, the first condition of the vehicle at the first time comprises:
  determining, based on the braking data and the acceleration data, that the vehicle has likely experienced a collision; and wherein the instruction to cause the vehicle automation hub to adjust the configuration of the one or more components of the vehicle comprises an instruction to activate a camera in the vehicle.

16. The system of claim 14:

wherein the vehicle data that indicates the attribute of the vehicle comprises:
  microphone data indicating a sound of glass breaking; and
  speed data indicating that the vehicle is stationary;

wherein determining, based on the vehicle data, the first condition of the vehicle at the first time comprises:
  determining, based on the microphone data and the speed data, that the vehicle has likely experienced a break-in; and wherein the instruction to cause the vehicle automation hub to adjust the configuration of the one or more components of the vehicle comprises an instruction to activate an audible alarm of the vehicle.

17. The system of claim 14:

wherein the vehicle data that indicates the attribute of the vehicle comprises:
  speed data indicating a vehicle speed that exceeds a threshold speed;

wherein determining, based on the vehicle data, the first condition of the vehicle at the first time comprises:
  determining, based on the speed data, that the vehicle is likely being recklessly operated; and wherein the instruction to cause the vehicle automation hub to adjust the configuration of the one or more components of the vehicle comprises an instruction to activate a communication system of the vehicle, wherein the communication system enables audio communication between a user of the monitoring system and an operator of the vehicle.

18. A non-transitory computer-readable medium storing software comprising instructions executable by one or more computers which, upon such execution, cause the one or more computers to perform operations comprising:

obtaining, at a first data transfer rate and by a monitoring system that is configured to monitor a property and from a vehicle automation hub configured to communicate with a computer system of a vehicle associated with the property when the vehicle is in a normal use mode, vehicle data that indicates an attribute of the vehicle;

obtaining sensor data captured by one or more sensors at the property;

determining, based on the vehicle data, a first condition of the vehicle at a first time;

determining, using the sensor data, that an event related to the property likely occurred;

accessing a set of rules including a first rule indicating a vehicle condition, an event condition related to a property, a timeframe of applicability, and one or more actions, wherein the one or more actions include transmitting, from the vehicle automation hub and to the monitoring system, additional vehicle data at a second data transfer rate, the second data transfer rate being higher than the first data transfer rate, wherein the set of rules includes rules for monitoring a plurality of vehicles including the vehicle, each vehicle being associated with one or more rules, included in the set of rules, that are for that vehicle, each rule being applicable to one or more of the plurality of vehicles, and at least a first vehicle associated with a different set of rules than a second vehicle;

selecting, from the set of rules and using data for the event related to the property that likely occurred and at least some of the vehicle data, the first rule in response to determining that i) the first rule is included in one or more rules for the vehicle ii) the first condition of the vehicle satisfies the vehicle condition indicated by the first rule, iii) the event that likely occurred satisfies the event condition related to the property, and iv) that the first time satisfies the timeframe of applicability indicated by the first rule; and transmitting, to the vehicle automation hub, an instruction to cause the vehicle automation hub to adjust a configuration of one or more components of the vehicle using the first rule.

* * * * *